(12) United States Patent
Kashima

(10) Patent No.: US 6,519,158 B2
(45) Date of Patent: Feb. 11, 2003

(54) IC CARD READ/WRITE APPARATUS

(75) Inventor: Masanori Kashima, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/078,660

(22) Filed: Feb. 21, 2002

(65) Prior Publication Data

US 2002/0075659 A1 Jun. 20, 2002

Related U.S. Application Data

(62) Division of application No. 09/366,195, filed on Aug. 4, 1999, now Pat. No. 6,421,245.

(30) Foreign Application Priority Data

Aug. 5, 1998 (JP) ............................................. 10-221369
Aug. 7, 1998 (JP) ............................................. 10-223938

(51) Int. Cl.$^7$ .......................... H05K 7/14; G06K 13/06; H01R 13/62
(52) U.S. Cl. ....................... 361/737; 361/741; 361/756; 361/801; 439/260; 235/475
(58) Field of Search ................................ 361/737, 728, 361/740, 732, 756, 747, 741, 801; 439/260; 235/441, 475, 482

(56) References Cited

U.S. PATENT DOCUMENTS

| 4,976,639 | A |   | 12/1990 | Schuder et al. |           |
|-----------|---|---|---------|----------------|-----------|
| 5,146,070 | A | * | 9/1992  | Toma           | 235/475   |
| 5,300,763 | A | * | 4/1994  | Ito et al.     | 235/475   |
| 5,466,914 | A | * | 11/1995 | Kitahara       | 235/483   |
| 5,563,397 | A | * | 10/1996 | Fujimoto et al.| 235/441   |
| 5,613,866 | A |   | 3/1997  | Niimura        | 439/260   |
| 5,718,609 | A |   | 2/1998  | Braun et al.   | 439/630   |
| 5,904,589 | A |   | 5/1999  | Asakawa        | 439/495   |
| 6,070,802 | A | * | 6/2000  | Yi             | 235/475   |
| 6,196,464 | B1| * | 3/2001  | Patterson et al.| 235/447  |
| 6,421,245 | B1| * | 7/2002  | Kashima        | 361/737   |

FOREIGN PATENT DOCUMENTS

JP 4-184694 7/1992
JP 5-120498 5/1993

* cited by examiner

*Primary Examiner*—David Martin
*Assistant Examiner*—Dameon E. Levi
(74) *Attorney, Agent, or Firm*—Wenderoth, Lind & Ponack, L.L.P.

(57) ABSTRACT

A protection mechanism for use with an IC card read/write apparatus comprises a housing that defines a slot having an inlet and an outlet. The housing is constructed and arranged to allow passage of an IC card through the slot from the inlet to the outlet and into an IC card read/write apparatus. A first arm is movable between a first position at which the first arm is positioned in the slot and a second position at which the first arm is positioned out of the slot. The first arm is constructed and arranged to move from the first position to the second position in response to being contacted by the IC card as the IC card passes through the slot from the inlet to the outlet. A shutter is movable between a third position at which the shutter blocks the outlet and a fourth position at which the shutter does not block the outlet. A second arm is associated with the first arm and the shutter such that as the first arm moves from the first position to the second position the second arm moves the shutter from the third position to the fourth position, and as the first arm moves from the second position to the first position the second arm moves the shutter from the fourth position to the third position.

21 Claims, 26 Drawing Sheets

IC CARD READ/WRITE APPARATUS

This is a divisional application of Ser. No. 09/366,195, filed Aug. 4, 1999 now U.S. Pat. No. 6,421,245.

FIELD OF THE INVENTION

The present invention relates to an IC card read/write apparatus for an IC card equipped with an integrated circuit. In particular, the present invention relates to an IC card read/write apparatus for reading information from the integrated circuit of the IC card and writing information into the same.

BACKGROUND OF THE INVENTION

FIGS. 1 to 6 illustrate a conventional IC card read/write device. The read/write device generally indicated by reference numeral 1 includes a rectangular peripheral frame portion 3. The frame portion 3 includes a pair of spaced apart top and bottom plates, 7 and 9, which define a thinned card chamber 11 between them for receiving an IC card 13. The peripheral frame portion 3 is formed in its forward wall 15 with a card inlet 17 which is connected with the card chamber 11 so that the IC card 13 can be inserted through the card inlet 17 into the card chamber 11 in a direction indicated at 19.

A slider 21, which is supported by the top plate 7 to move back and forth in the direction 19, is connected with a spring 23 mounted on the top plate 7 and thereby biased toward the card inlet 17. Also, the slider 21 is formed at one end thereof away from the card inlet 17 with a portion 25 projected into the card chamber 11 so that, when a leading edge of the card 13 has reached the vicinity of a rearward end of the card chamber 11, the leading edge makes an engagement with the projected portion 25. Further, as best shown in FIGS. 1, 5, and 6, the slider 21 has a cutout 27.

The top plate 7 carries a holder 29 which supports electric cables 31 on its upper surface and electric contacts 33 on its lower surface, with each of the electric contacts 33 being connected with an associated cable 31. The holder 29, which is rotatably supported by a shaft 35 extending in a direction perpendicular to the insert direction 19, has an actuator 37 projected in the cutout 27 of the slider 21. The actuator 37 is formed at its edge facing the inlet 17 with a ramp 39 which extends upward toward the rearward end of the device 1 and opposes an edge 41 of the cutout 27 so that, when the slider 21 moves rearward by the engagement with the leading edge of the card 13, the edge 41 would engage with the ramp 39 to rotate the actuator 37 and the holder 29 toward the bottom plate 9 as shown in FIGS. 5 and 6.

In addition, as best shown in FIG. 6, in the vicinity of the rearward end of the card chamber 11, the top plate 7 is formed in its bottom surface with ramps 43 each protruded in the card chamber 11. To cooperate with the ramps 43 to nip the leading end of the card 13 which has been inserted up to the rearward end of the chamber 11 and thereby hold the inserted card 13 in position, leaf springs 45 are provided under the card chamber 11 with their rearward ends positioned in the card chamber 11.

With the arrangement so constructed, as shown in FIG. 3, the card 13 is inserted through the card inlet 17 into the card chamber 11. When the card 13 is inserted to a predetermined position, its leading edge comes into contact with the projected portion 25 of the slider 21. From this state, the card 13 is further forced into the card chamber 11 against a resistance applied from the spring 23, which moves the slider 21 toward the rearward end of the chamber 11. As shown in FIGS. 5 and 6, this causes the edge 41 of the cutout 27 to make a frictional contact with the ramp 39 to rotate the holder 29 toward the bottom plate 9 so that each of the electric contacts 33 makes an electric contact with an associated contact 47 provided in an upper surface of the card 13.

Finally, when the card 13 is inserted to its reading/writing position as shown in FIGS. 4 and 6, it is nipped at its leading end between the ramps 43 of the top plate 7 and the leaf springs 45. This allows the card 13 to be retained in the card chamber 11 even after it is released from the insertion force. Also, the electric contacts 33 projected into the card chamber 11 make contact with associated contacts 47 of the card 13. This allows the integrated circuit mounted in the card 13 to communicate through the cables 31 with a controller (not shown) for reading information from the card 13 and writing information into the card 13.

After the completion of the required communication, the card 13 is held at its forward end and then pulled from the card chamber 11, causing the slider 21 to return to its original position under the force of the spring 23. This also causes the actuator 37 to disengage from the edge 41 of the cutout 27 and then rotate the holder 29 upward, so that the electric contacts 33 move away from the contacts 47 of the card 13.

The conventional card read/write device 1, however, has several drawbacks. For example, because the leaf springs 45 are typically made from a metal plate having a thickness of from 0.2 to 0.3 mm and also bent as shown in FIG. 5 at its intermediate portion, the position of the rearward end varies in the card chamber 11, which in turn destabilizes the force for nipping and holding the card 13.

In addition, the International Organization for Standardization (ISO) 7815 allows a dimensional error of 0.76±0.08 mm in the thickness of the IC card, which accelerates the instability of the inserted card 13 to result in an undesired translation of the card even from small vibrations. This may result in a communication error between the contacts of IC card 13 and the device 1. Contrary to this, an excessive force applied from the leaf springs 45 may cause the card to be scratched and then damaged by the contact with the metal leaf springs 45.

Also, an insertion of foreign members such as a coin, rather than the regular IC card, will result in a malfunction of device.

FIGS. 7 to 9 illustrate a protection cover generally indicated by reference numeral 51, which is attached in front of the IC card read/write device 1 described above. The protection cover 51 includes a housing generally indicated by reference numeral 53. The housing 53 has a card slot 55 through which the IC card 13 is inserted in the device 1. When the IC card 13 is not inserted in the device, the slot 55 is covered at its outlet by a shutter 57 rotatably supported by shafts 59.

For the protection cover 51, the card 13 is inserted in the slot 55 from its leading edge by the user of the card 13. When the leading edge of the card 13 makes contact with the shutter 57, the shutter 57 is forced to rotate about the shafts 59 away from an outlet of the slot 55, which allows the card 13 to advance into the card chamber.

The shutter 57; however, allows to enter into the device 1 foreign members that do not meet the ISO 7815, such as thinned telephone cards having a thickness of only 0.2 mm, other specialized small-sized cards, rods having a diameter smaller than the slot, and other small pieces. An insertion of such foreign members will damage the device 1 and, if retained therein, only in part, will prevent the regular card from being inserted or used.

SUMMARY OF THE INVENTION

Accordingly, an object of the present invention is to provide an IC card read/write device capable of positively holding an inserted card in position.

Another object of the present invention is to provide an IC card read/write device capable of preventing the IC card from being damaged.

Another object of the present invention is to provide an IC card read/write device capable of removing irregular members such as a coin from a card chamber, which would otherwise result in a malfunction of the device.

Another object of the present invention is to provide a protection cover, which allows only the normal IC card that meets the ISO 7815 to be inserted in an IC card read/write device.

Another object of the present invention is to provide an IC card read/write device capable of preventing the foreign members, rather than the normal IC card that meets the ISO 7815, from being inserted into the device.

Another object of the present invention is to provide an IC card read/write device capable of removing the foreign members inserted in the device.

Therefore, an IC card read/write apparatus of the present invention includes a frame having first and second parallel guides spaced apart from each other. The first and second guides define an extended and thinned card chamber for receiving an IC card, a card inlet connected at one end of the card chamber through which an IC card is inserted into the card chamber, and an end path or terminal portion provided at the opposite end of the card chamber and angled relative to the card chamber so that an insert end of the inserted IC card is forced in the path and then held in the end path or terminal portion.

In another aspect of the present invention, the end path or terminal portion is formed by a ramp extended from the opposite end of the first guide and projected toward the second guide and a recess extended from the opposite end of the second guide and recessed against the first guide.

In another aspect of the present invention, the ramp is angled at about 30 to 45 degrees relative to the first guide.

In another aspect of the present invention, the apparatus includes a plurality of the end paths or terminal portions.

Also, an IC card read/write apparatus includes a frame having upper and lower parallel plates spaced apart from each other to define an extended and thinned card chamber for receiving an IC card. The lower plate has an opening so that a foreign member inserted into the card chamber will fall out of the card chamber through the opening.

In another aspect of the present invention, an edge defining the opening is slanted downward.

Further, a protection mechanism for use with an IC card read/write apparatus includes a housing which defines a slot having an inlet and an outlet. Through the inlet and outlet an IC card is inserted into the IC card read/write apparatus. The protection mechanism also includes a first arm which moves between a first position in which the first arm is positioned in the slot and a second position in which the first arm is positioned away from the slot, wherein the first arm moves from the first position to the second position by the contact with the IC card inserted into the slot. Also included is a shutter which moves between a first position at which the shutter closes the outlet of the slot and a second position at which the shutter moves away from the outlet of the slot. Further included is a second arm, connected with the first arm so that, when the first arm moves from its first position to its second position, the second arm moves the shutter from its first position to its second position to open the outlet of the slot and, when the first arm moves from its second position to its first position, the second arm moves the shutter from its second position to its first position to close the outlet of the slot.

In another aspect of the present invention, the apparatus includes a tongue bent or curved away from the outlet of the slot. The tongue is supported by the shutter so that, when the shutter moves to the first position, the tongues are positioned adjacent to the outlet of the slot. On the other hand, when the shutter moves to the second position, the tongues make frictional contact with one surface of the IC card to move away from the outlet.

DETAILED DESCRIPTION OF THE PREFERRED EMBODIMENTS

Figure 1:
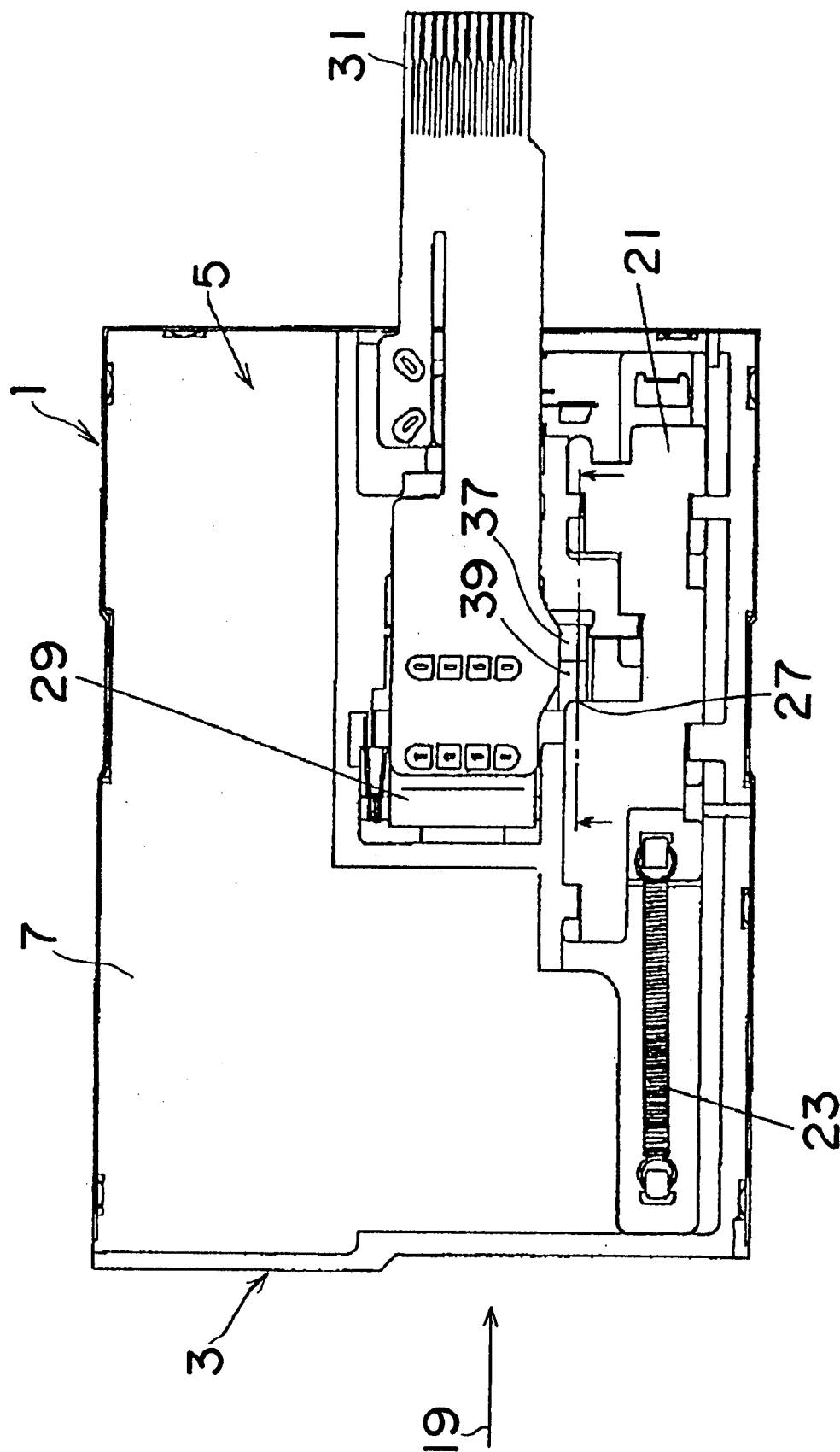
FIG. 1 is a plan view of a conventional IC card read/write device.
Figure 2:
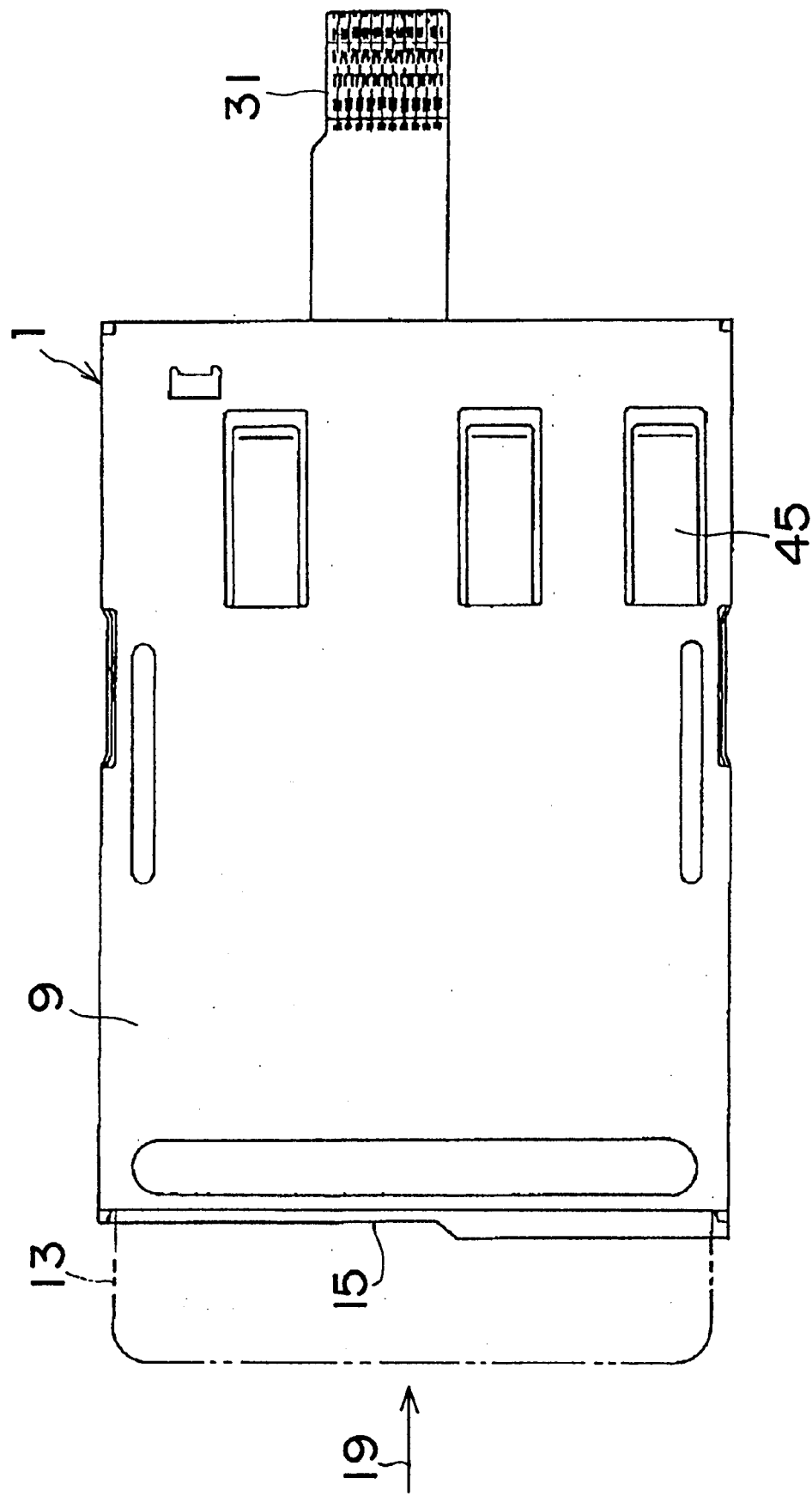
FIG. 2 is a bottom view of the conventional IC card read/write device shown in FIG. 1.
Figure 3:
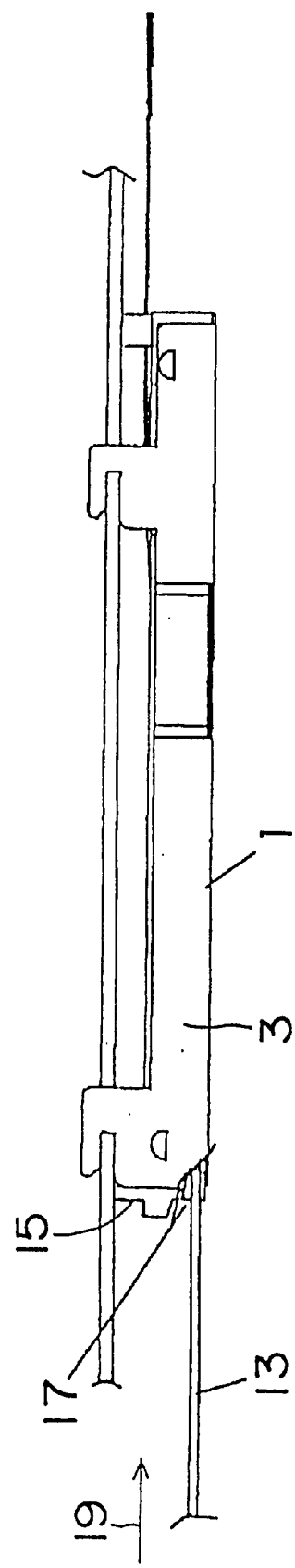
FIG. 3 is a side elevational view, partially in section, of the conventional IC card read/write device shown in FIG. 1.
Figure 4:
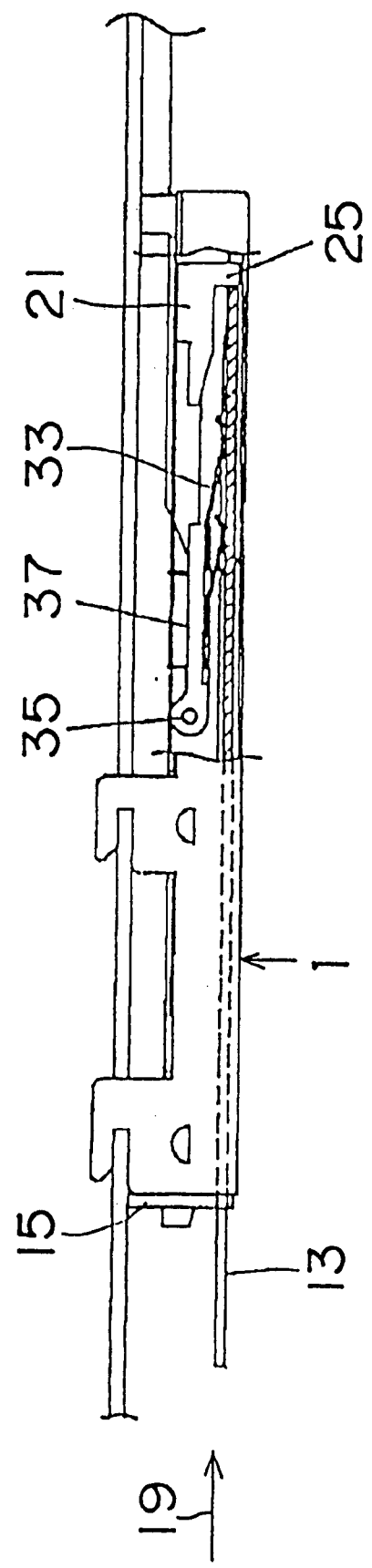
FIG. 4 is also a side elevational view, partially in section, of the conventional IC card read/write device shown in FIG. 1.
Figure 5:
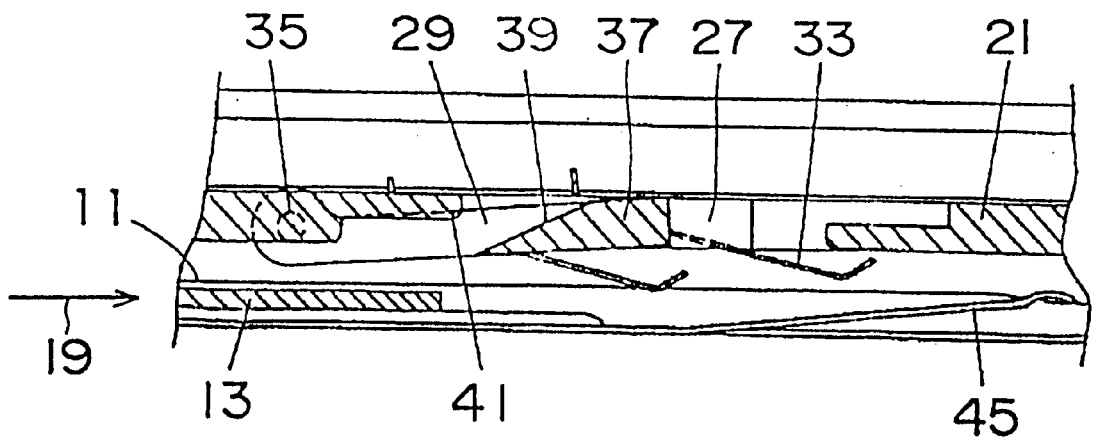
FIG. 5 is an enlarged cut-away side elevational view of the conventional IC card read/write device shown in FIG. 1.
Figure 6:
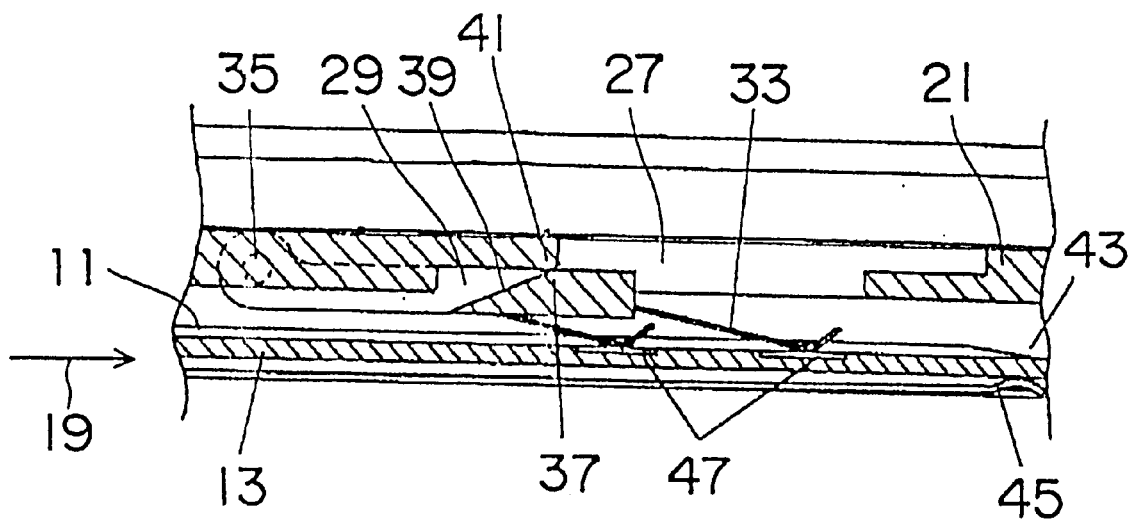
FIG. 6 is an enlarged cut-away side elevational view of the conventional IC card read/write device shown in FIG. 1.
Figure 7:
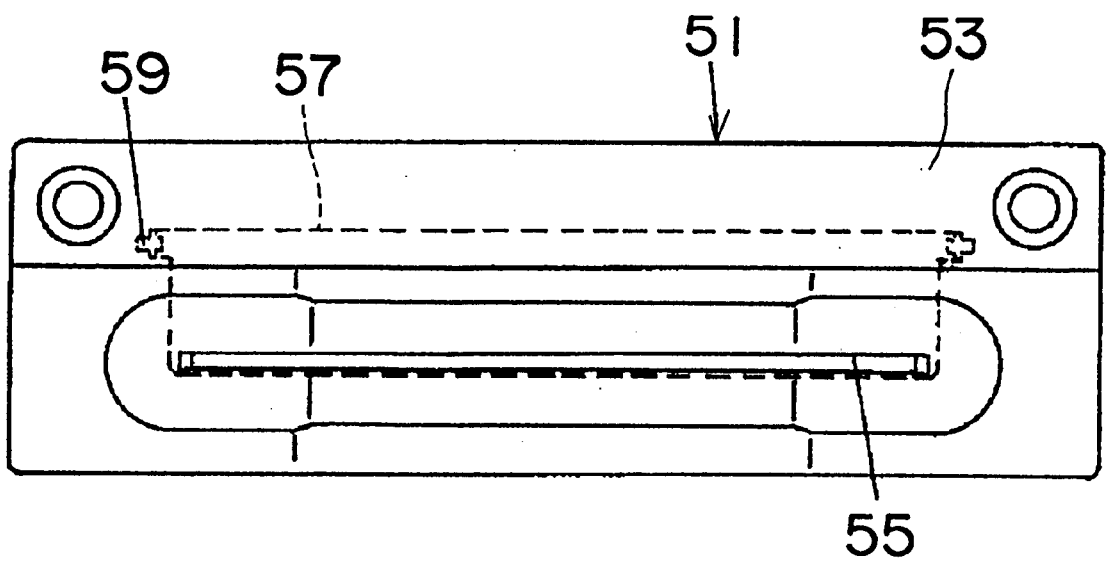
FIG. 7 is a front view of a conventional protection cover for use with the IC card read/write device shown in FIG. 1.
Figure 8:
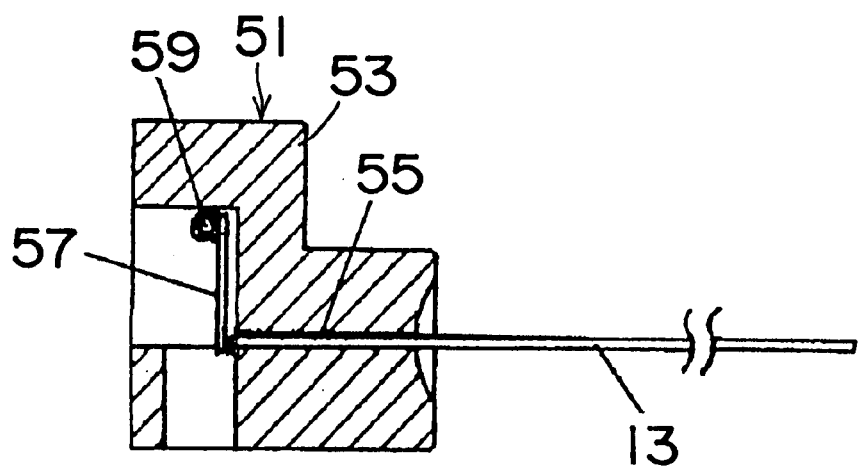
FIG. 8 is a cut-away side elevational view of the conventional protection cover shown in FIG. 7.
Figure 9:
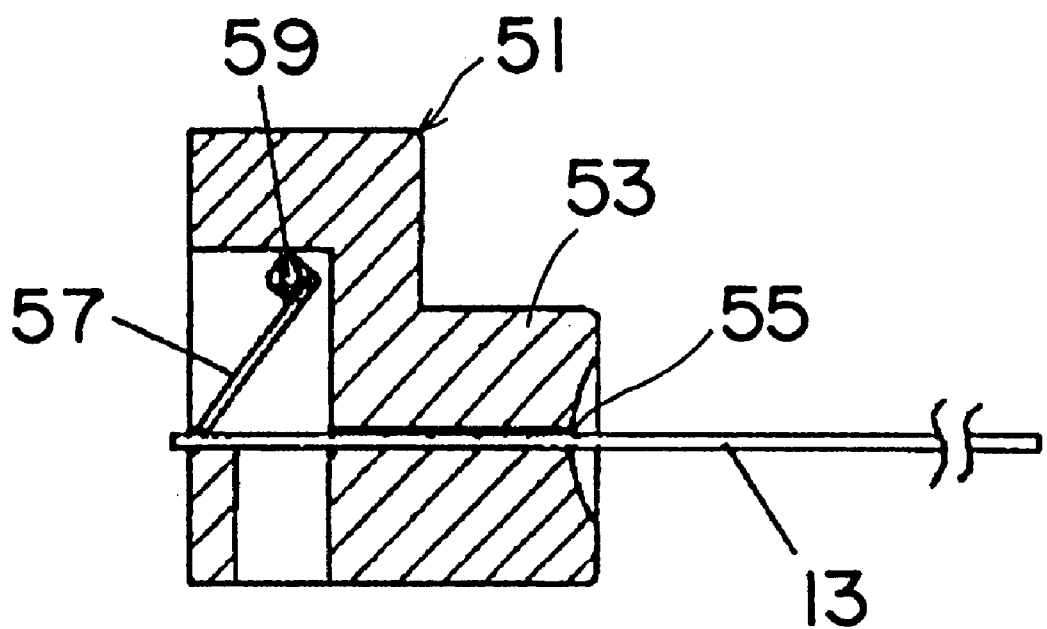
FIG. 9 is also a cut-away side elevational view of the conventional protection cover shown in FIG. 7.
Figure 10:
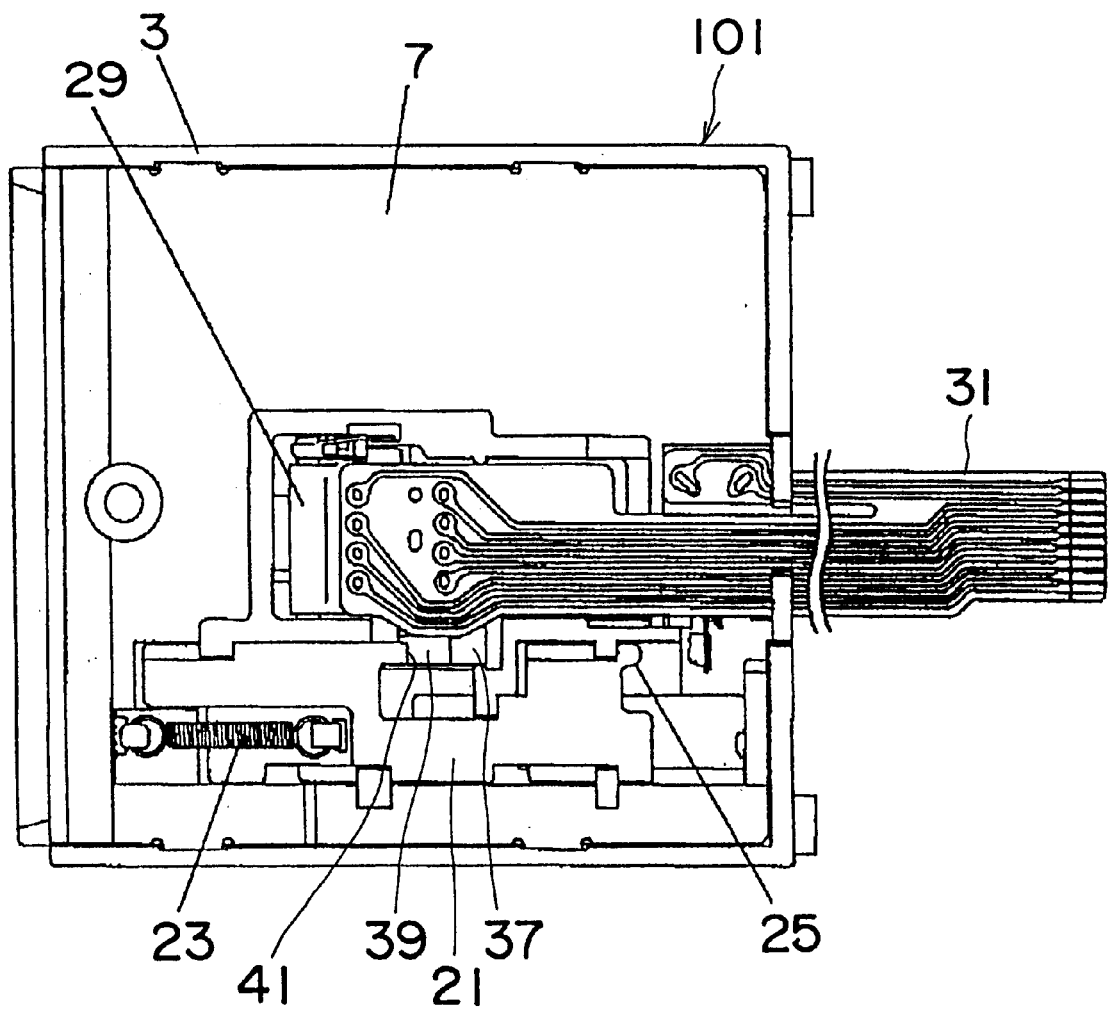
FIG. 10 is a plan view of an IC card read/write device according to the present invention.

With reference to the drawings, preferred embodiments of the present invention will be described below. Referring to FIG. 10, there is shown an IC card read/write device according to the present invention, generally indicated by reference numeral 101.

Basically, the read/write device 101 is similar to the conventional read/write device 1 described in connection with FIGS. 1 to 6, and therefore, like reference numerals designate like parts throughout the drawings. Also, to clarify the description and to highlight the features of the present invention, only portions and parts different from those noted above will be described in detail below.

Figure 11:
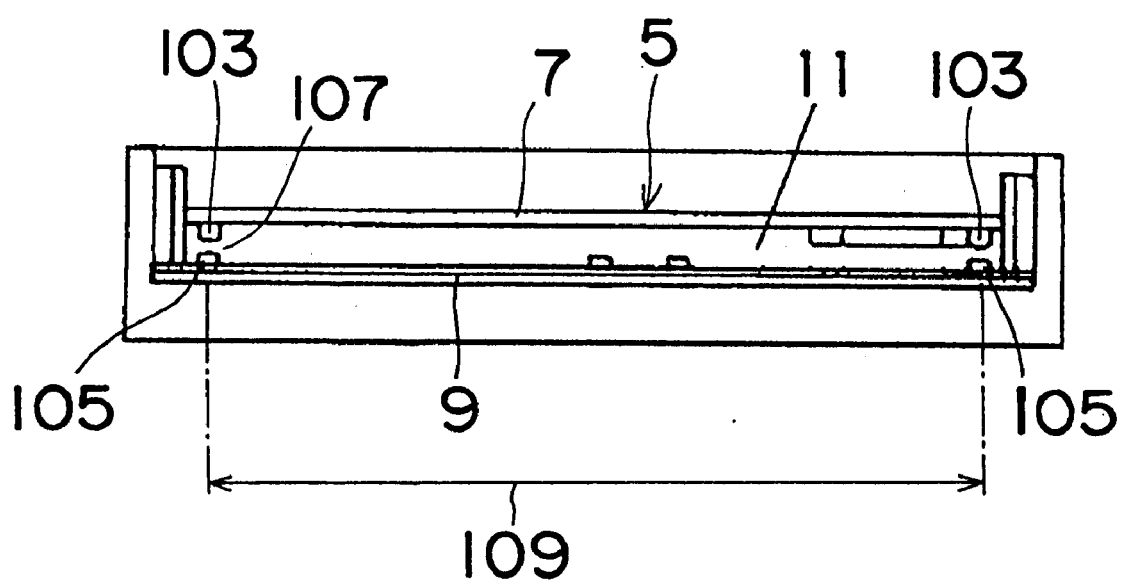
FIG. 11 is a front view of the IC card read/write device shown in FIG. 10.

Specifically, as best shown in FIG. 11, the top plate 7 is formed in its bottom surface with a pair of upper guide ribs 103 extending from the inlet 17 to the rearward end of the card chamber 11 on opposite sides, i.e., left and right sides, of the chamber 11. The bottom plate 9 is formed in its upper surface with a pair of lower guide ribs 105 extending from the inlet 17 to be the rearward end of the card chamber 11 on opposite sides, i.e., left and right sides, of the chamber 11. The upper and lower ribs, 103 and 105, oppose each other to define a gap 107 therebetween which is slightly greater than the thickness of the regular IC card 13 to be inserted.

Preferably, as shown in FIG. 11, a distance 109 between the left and right ribs, 103 and 105, is about 50 mm, which is smaller than the regular card size (i.e., 53.92 to 54.03 mm) in its transverse direction regulated in the ISO 7815. Although the opposing upper and lower ribs, 103 and 105 are provided only on left and right sides of the chamber 11, they may be added at the center of the chamber 11.

Figure 15:
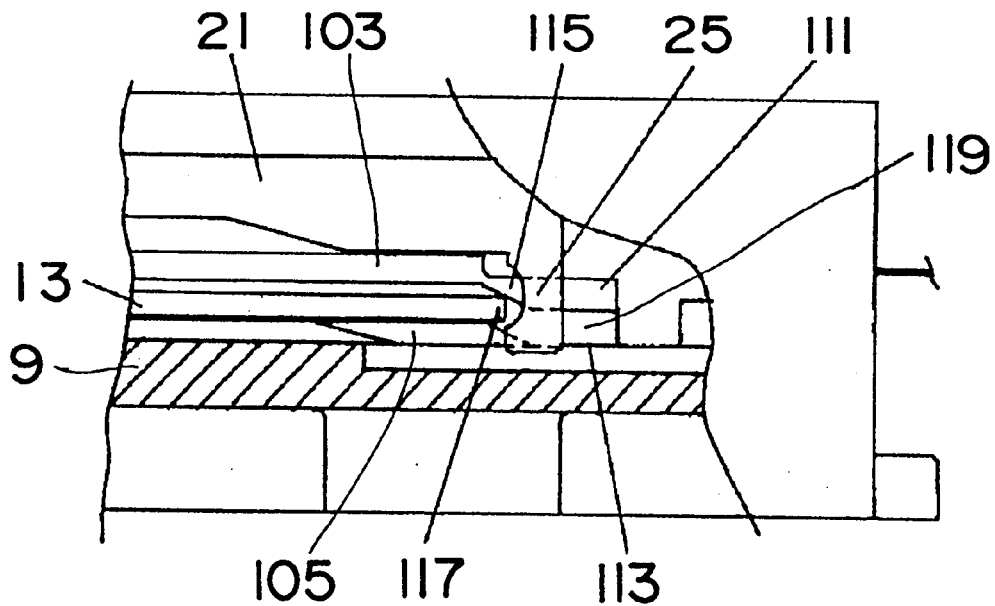
FIG. 15 is an enlarged cut-away side elevational view of the IC card read/write device shown in FIG. 10.
Figure 16:
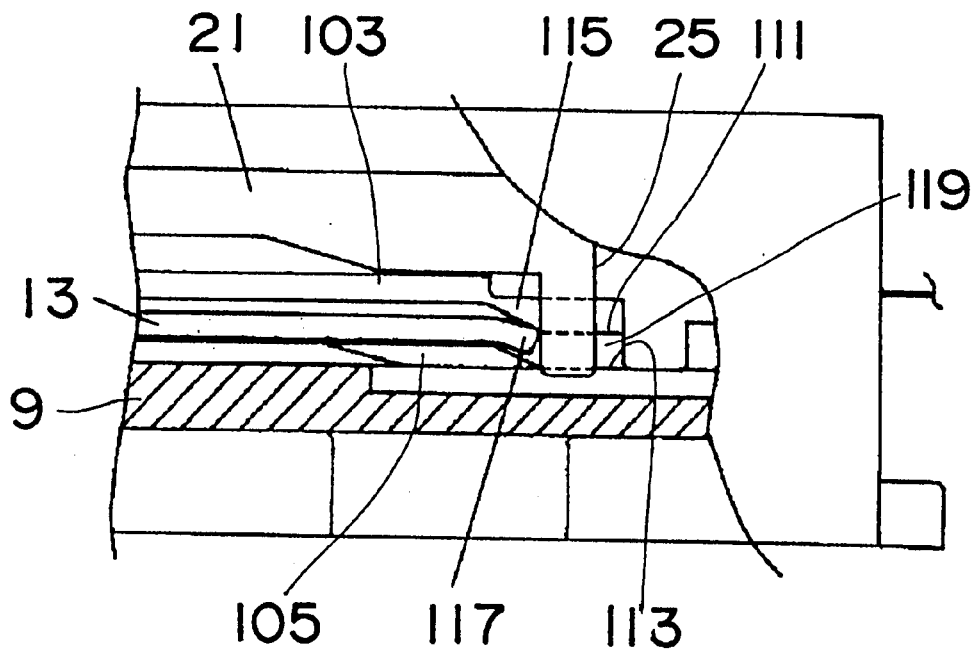
FIG. 16 is also an enlarged cut-away side elevational view of the IC card read/write device shown in FIG. 10.
Figure 17:
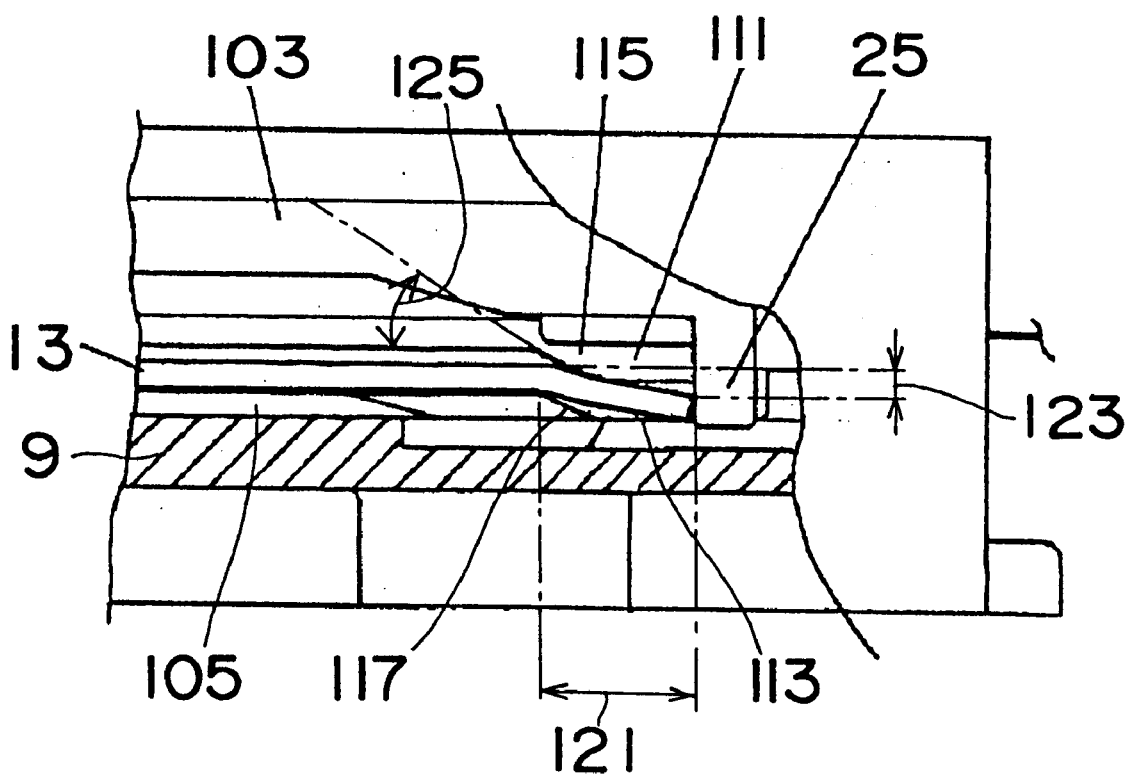
FIG. 17 is also an enlarged cut-away side elevational view of the IC card read/write device shown in FIG. 10.
Figure 18:
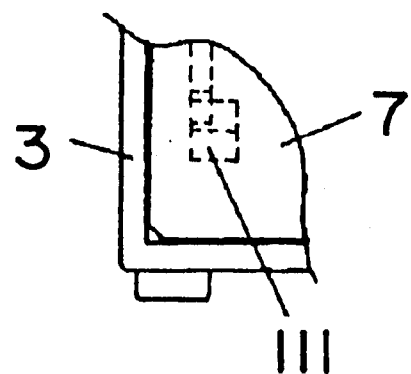
FIG. 18 is a partial plan view of the IC card read/write device shown in FIG. 10.
Figure 19:
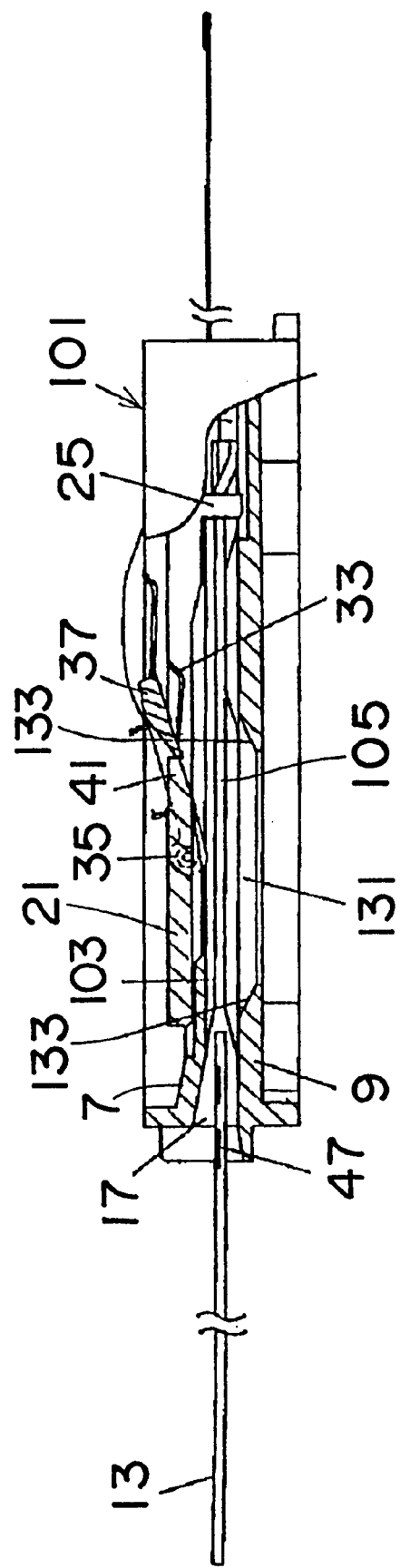
FIG. 19 is a cut-away side elevational view of the IC card read/write device of another embodiment.
Figure 20:
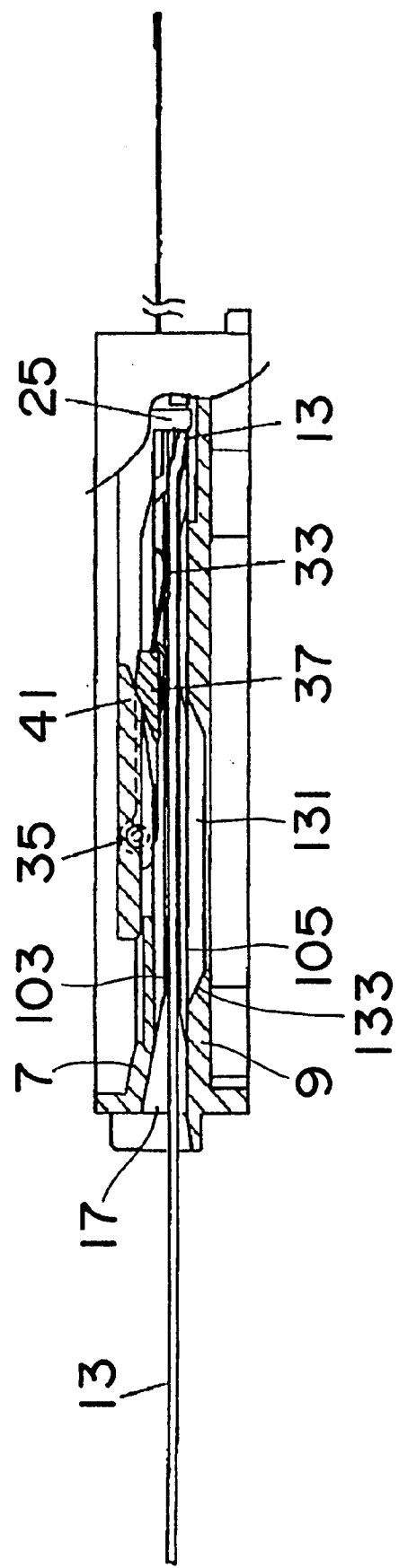
FIG. 20 is a cut-away side elevational view of the IC card read/write device shown in FIG. 19.
Figure 21:
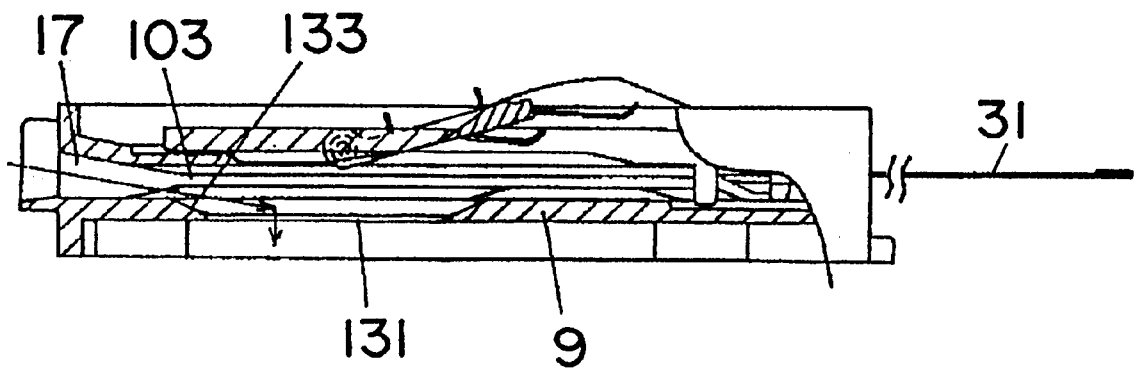
FIG. 21 is a cut-away side elevational view of the IC card read/write device shown in FIG. 19.
Figure 22:
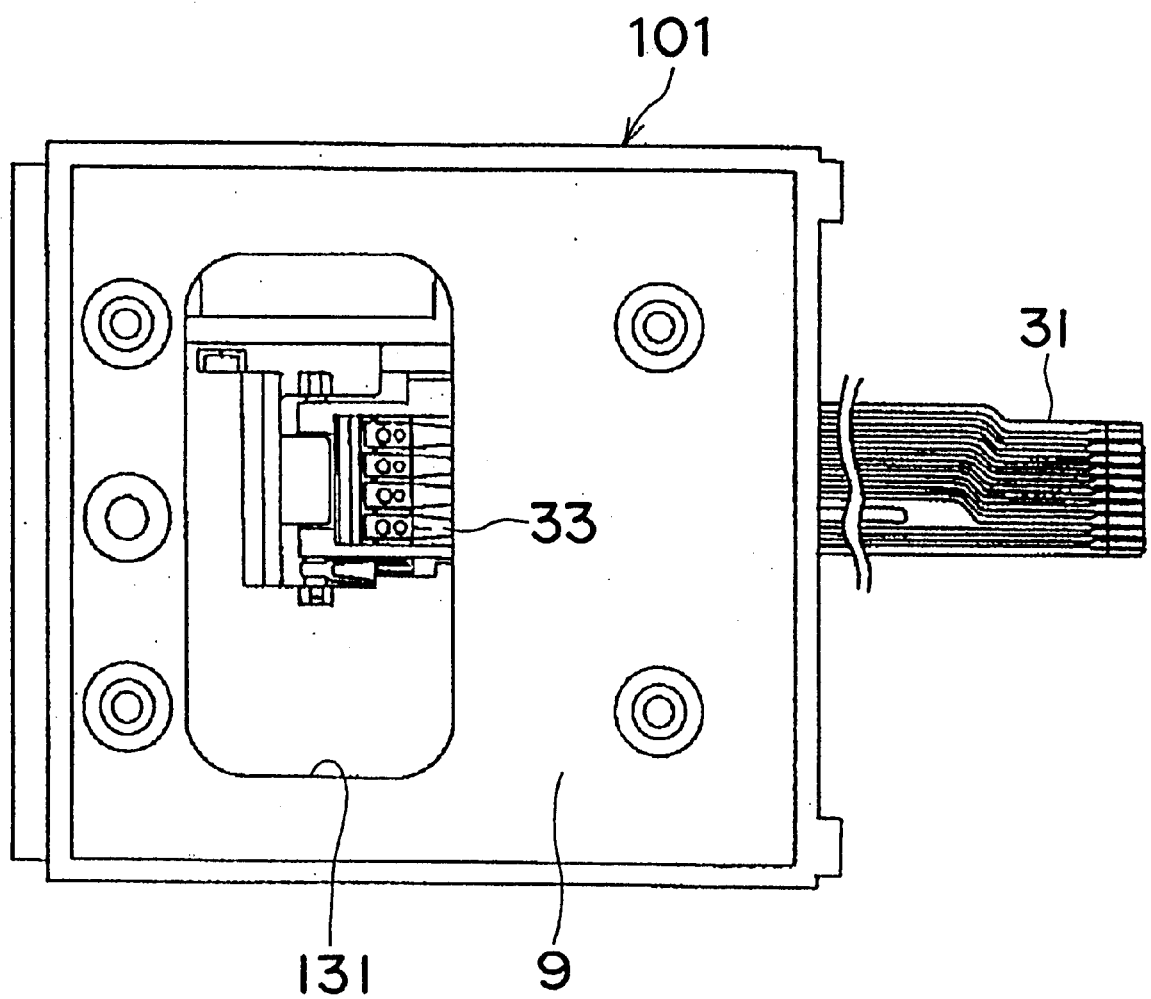
FIG. 22 is a bottom view of the IC card read/write device shown in FIG. 19.

In addition, as shown in FIGS. 15 to 17, in the vicinity of the projection 25 of the slider 21, each of the upper ribs 103 is formed with a portion 111 projected downward and each of the lower ribs 105 is formed with a portion 113 recessed downward. Also, the projected and recessed portions, 111 and 113, are ramped downward at their inlet-side ends. The ramped ends of the projected and recessed portions, 111 and 113, will be referred to as ramps, 115 and 117, hereinafter, as necessary.

An end path (terminal portion) or gap 119 between the upper projected portion 111 and the lower recessed portion 113 and further upper and lower ramps, 115 and 117, should be dimensioned so that the regular-sized card 13 can be inserted between the projected and recessed portions, 111 and 113, and, when inserted, positively retained by frictional forces generated between the card 13 and the corresponding contact portions. Preferably, as shown in FIG. 17, a length 121 of the portion of the card 13 to be held between the projected and recessed portions, 111 and 113, is about 2 to 4 mm, and a deformation 123 of the card caused by the insertion is about 0.3 to 1.0 mm. Also, preferably, an angle 125 of the ramps 115 and 117 is about 30 to 45 degrees.

Preferably, to provide both the ramps and the gap between them with a greater dimensional precision and thereby to hold the card 13 in a desired position, the top and bottom plates, 7 and 9, are made of material having a greater rigidity, such as, polybutylene terephthalate (PBT) with glass fibers, liquid crystal polymer (LCP) with glass, and polyphenylene sulfide (PPS).

Also, to determine whether the card 13 is inserted in place and thereby electrical connections are made between the contacts of the device 101 and card 13, a detector or switch may be provided adjacent to the rearward end of the card chamber 11. The detector may be any conventional optical or mechanical device such as a photocoupler. For this purpose, the detector is connected through suitable cables with a controller (not shown).

Preferably, the controller includes a delay circuit so that, after a predetermined time delay from the detection of the card 13 by the detector, a required communication between the controller and the integrated circuit begins.

Figure 12:
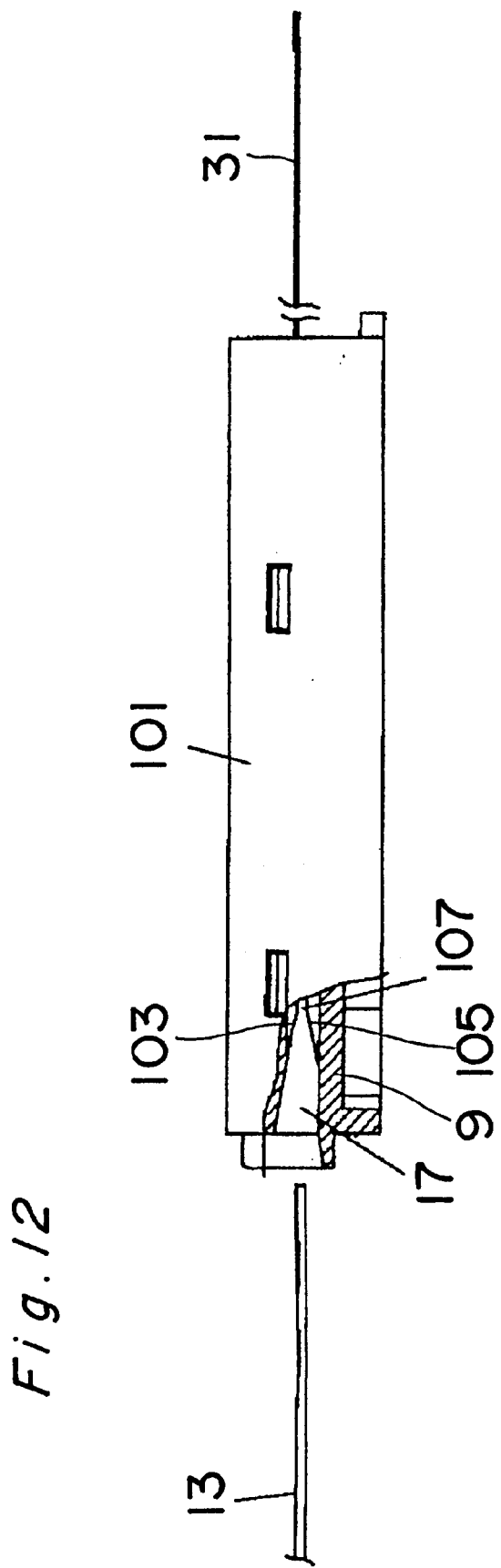
FIG. 12 is a side elevational view, partially in section, of the IC card read/write device shown in FIG. 10.
Figure 13:
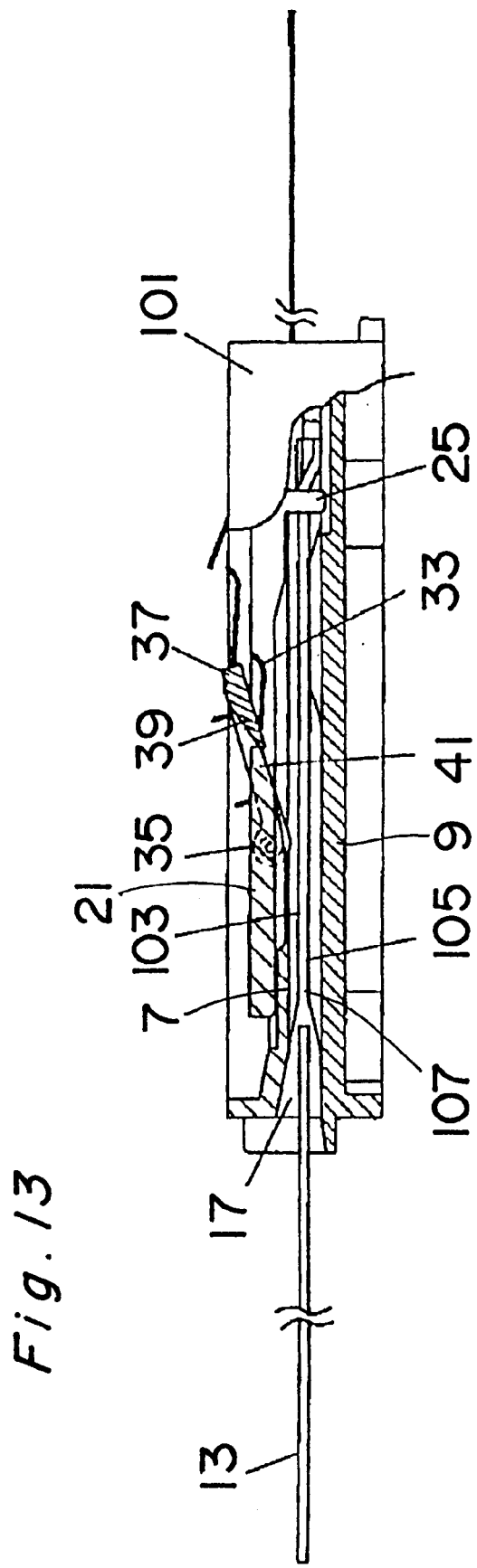
FIG. 13 is also a side elevational view, partially in section, of the IC card read/write device shown in FIG. 10.
Figure 14:
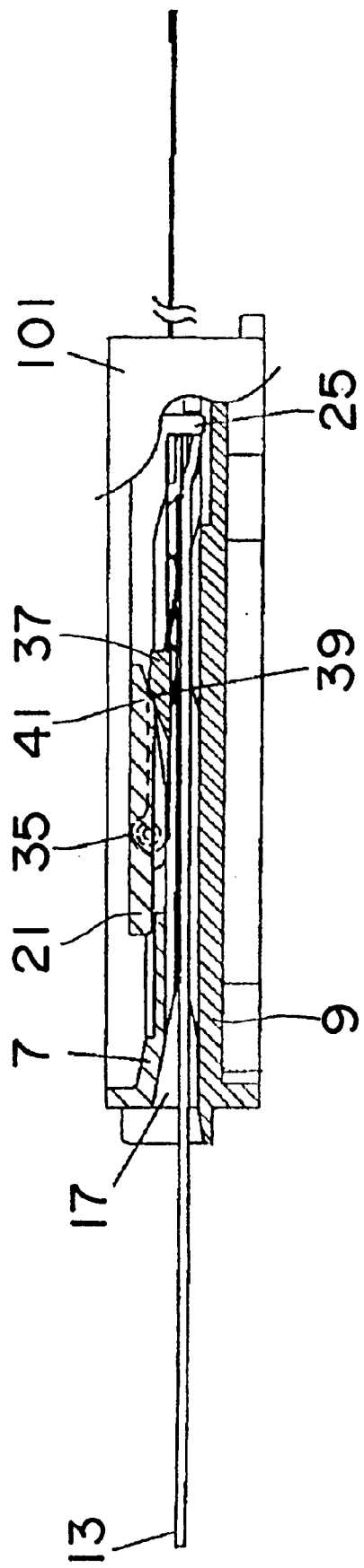
FIG. 14 is also a side elevational view, partially in section, of the IC card read/write device shown in FIG. 10.

In operation of the device 101 so constructed, as shown in FIGS. 12 to 14, the card 13 is inserted by the card user through the card inlet 17 into the card chamber 11. When the card 13 is inserted to the predetermined position, its leading edge comes into contact with the projected portion 25 of the slider 21. From this position, the card 13 is further forced into the card member against the force of spring 23 to move the slider 21 toward the rearward end of the chamber 11. This causes the edge 41 of the cutout to make frictional contact with ramp 39 of the holder 29 to bring the electric contacts 33 into contact with the associated contacts 47 in the upper surface of the card 13.

Then, as shown in FIGS. 15 to 17, the leading edge of the card 13 is forced in between the opposing ramps 115 and 117, preferably about 2 to 4 mm, so that it is deformed about 0.3 to 1.0 mm. This results in a frictional force between the deformed end of the card 13 and portions 111 and 113, which retains the card 13 in the inserted position positively.

Note that, when the card 13 makes contact with the upper ramps 111, the user feels the contact between the card 13 and the ramps 111. Also, when the card 13 is further inserted from this contact position to between the ramps, the user receives a click derived from the bending of the leading end of the card 13.

At the completion of the card insertion, each of the electric contacts 33 of the holder 29 makes contact with the associated contact 47 of the card 13. At the same time, the card detector detects that the card 13 has been inserted to a predetermined position and then transmits a signal through the corresponding cables to the controller. The controller, after a short time delay, begins to communicate with the integrated circuit in the card 13.

After the completion of the required communication, the card 13 is held by the user at is forward end and then pulled from the card chamber 11. This causes the slider 21 to return to is original position by the spring 23. This also causes the holder 29 to disengage from the edge 41 of the cutout 27 and then rotate upward from the card member.

As can be seen from the above description, the card 13 inserted in the card chamber 11 can positively be held without any translation, regardless of possible vibrations generated in and transmitted from other neighboring devices. In particular, the projected and recessed portions, 111 and 113, made of rigid material holds the card 13 in the predetermined position with great precision, regardless of the spring force biasing the card toward the inlet from the ramps 115 and 117. This ensures a good communication between the integrated circuit and the controller.

Although the projected and recessed portions are formed in the top and bottom plates, 7 and 9, respectively, they may be formed in opposite plates.

Also, although the forward end of the recessed portion is also ramped similar to the opposing ramp of the projected portion, it may be stepped downward to define a space into which the leading end of the card can move.

Further, although the ramp 115 of the projected portion 111 extends linearly, it may be curved instead.

FIGS. 19 to 22 illustrate another embodiment of the device, in which the bottom plate 9 is formed with an opening 131 between the left and right ribs 105. The opening 131 is sized so that it has a dimension of about 45 mm in the transverse direction and about 22 mm in the insert direction. Preferably, a peripheral edge 133 of the opening 131 is ramped downward so that, when a foreign member such as coin is inserted in the card chamber 11, it would be guided into the opening 131 and then removed out of the chamber 11. Advantageously, the opening 131 is provided on the forwarded side of the contacts 33 to prevent the contacts 33 from begin damaged by the contact with the foreign member and to allow the foreign member to drop through the opening 131 by its weight.

With this arrangement, the foreign member will be removed from the chamber 11 and the contacts 33 can be protected from such a member.

Figure 23:
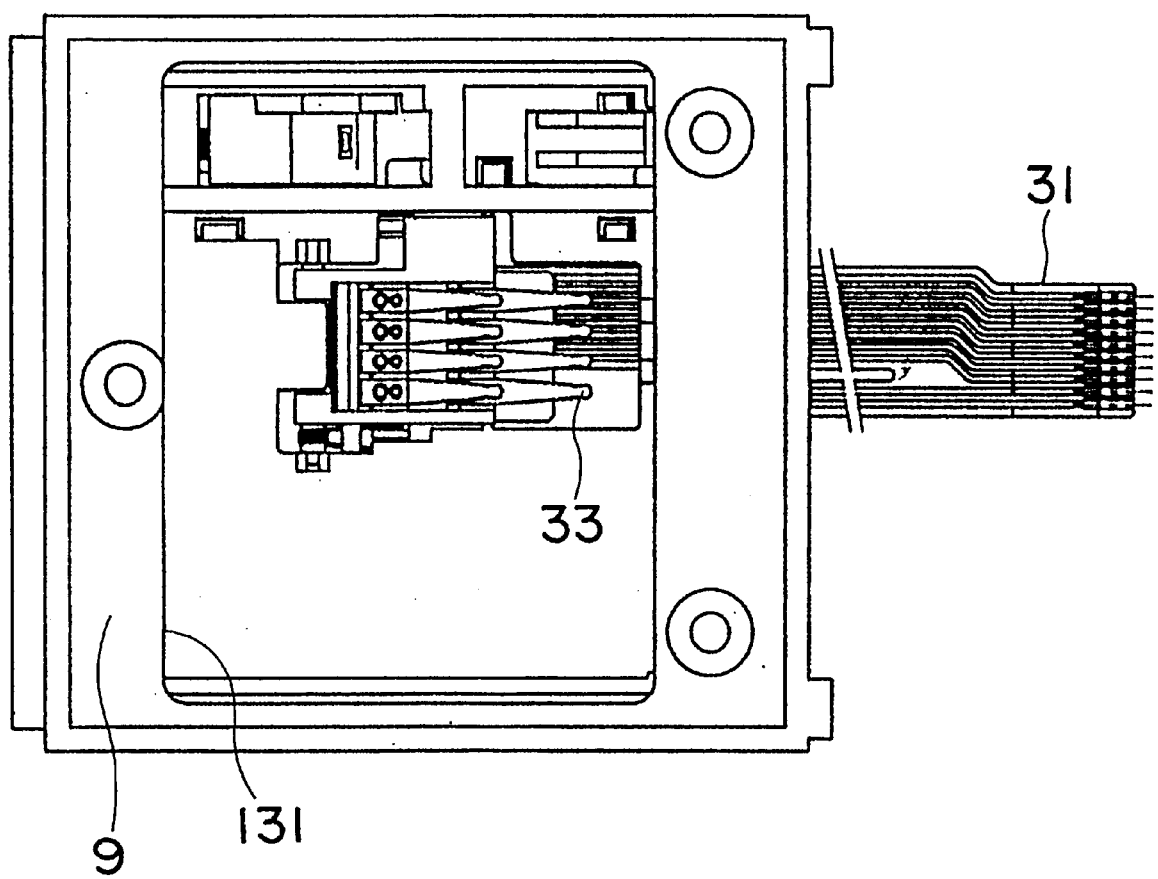
FIG. 23 is a bottom view of another IC card read/write device.
Figure 24:
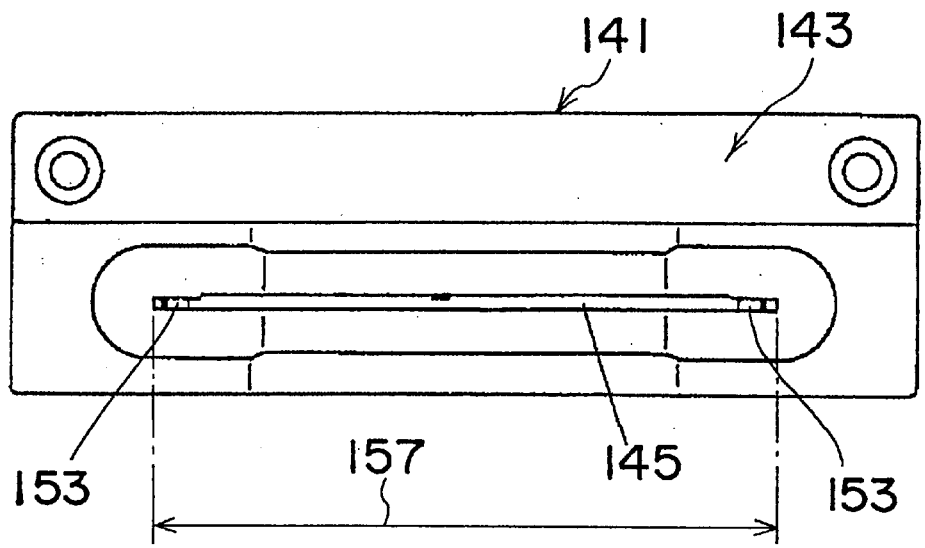
FIG. 24 is a front view of a protection cover according to the present invention.
Figure 25:
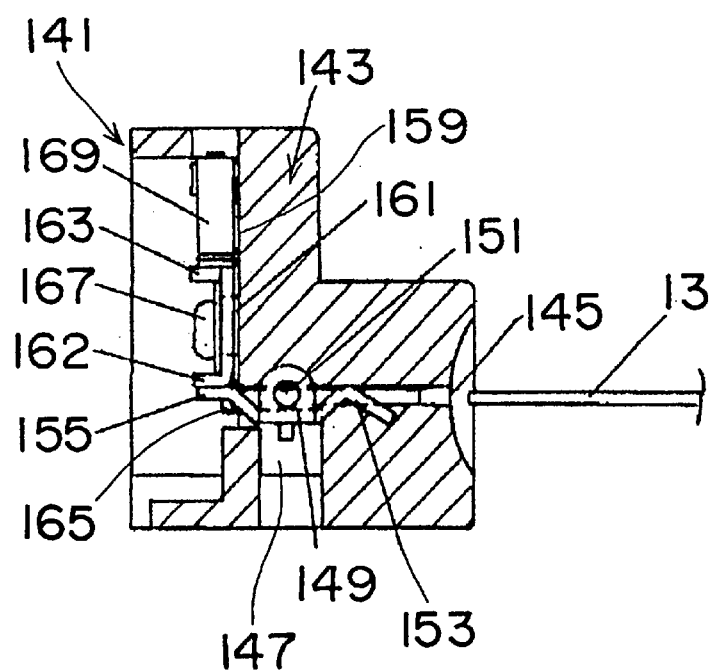
FIG. 25 is a cut-away side elevational view of the protection cover shown in FIG. 24.
Figure 26:
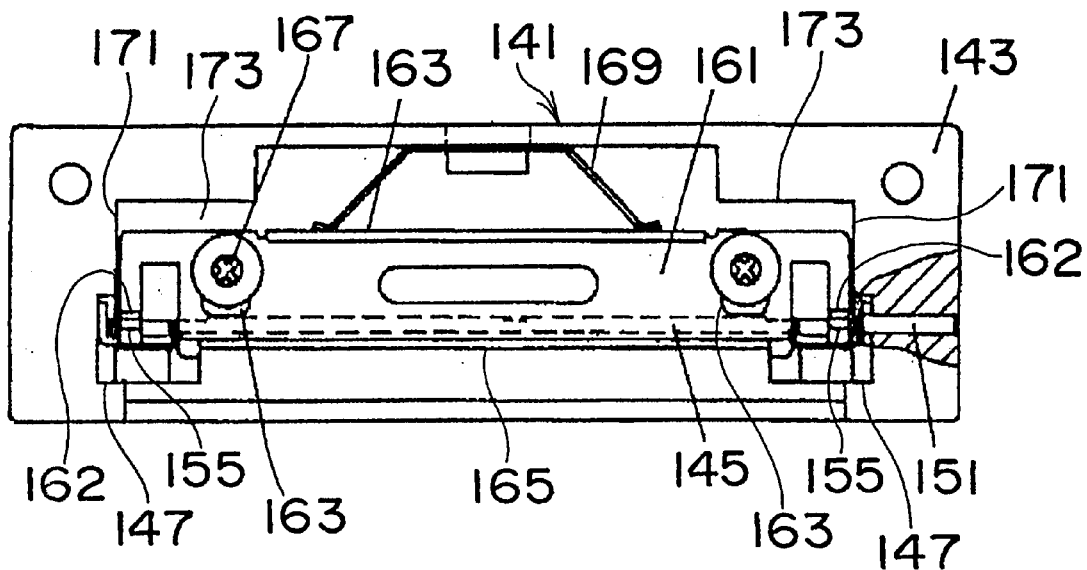
FIG. 26 is another front view of the protection cover shown in FIG. 24.
Figure 27:
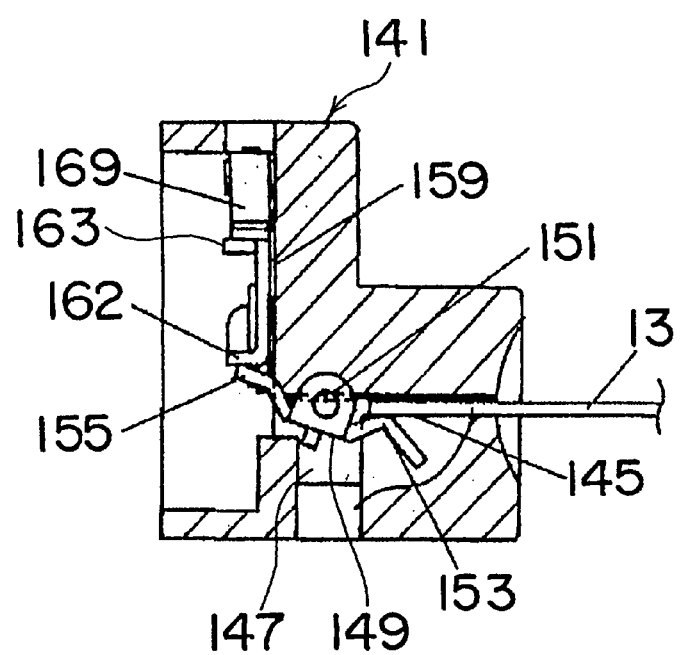
FIG. 27 is a cut-away side elevational view of the protection cover shown in FIG. 26.
Figure 28:
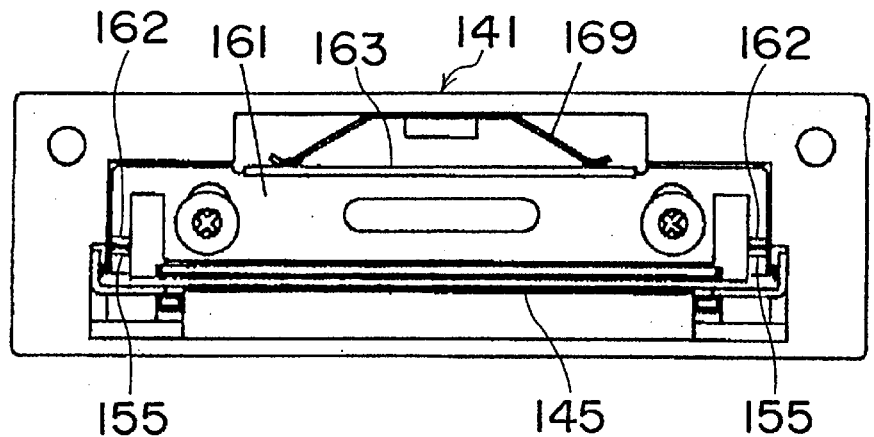
FIG. 28 is another front view of the protective cover shown in FIG. 24.
Figure 29:
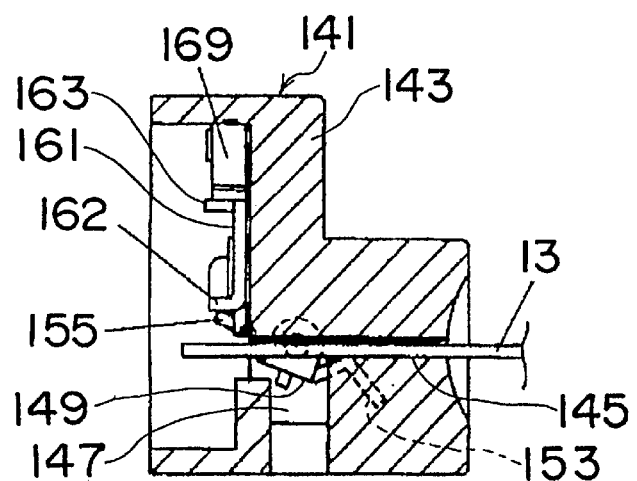
FIG. 29 is a cut-away side elevational view of the protection cover shown in FIG. 28.
Figure 30:
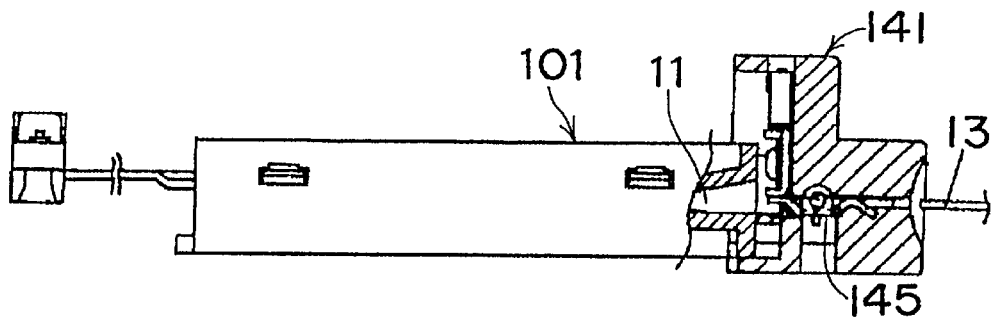
FIG. 30 is a side elevational view, partially in section, of the IC card read/write device to which the protection cover is assembled.
Figure 31:
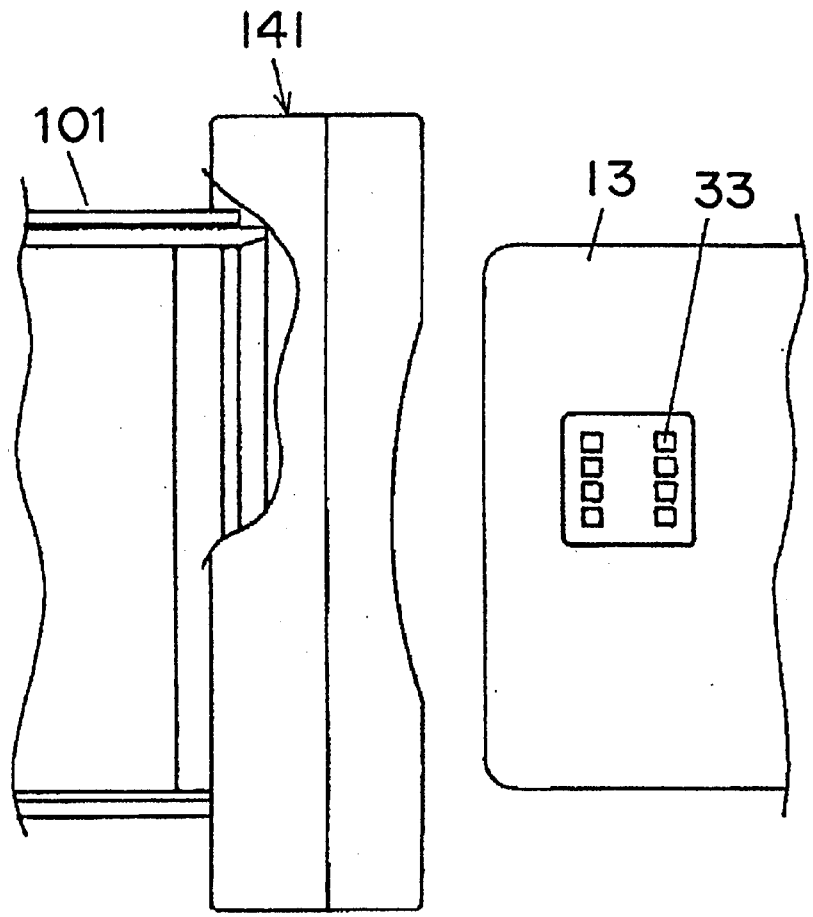
FIG. 31 is a partial plan view of the IC card read/write device and the IC card.

The size of the opening 131 described above is not restrictive to the present invention and may be enlarged as much as possible provided that it does not result in a decrease of structural strength of the device bottom plate 9. For example, as shown in FIG. 23, the opening 131 may be sized so that it is greater than the regular card size (i.e., 53.92 to 54.03 mm) in its transverse direction regulated in the ISO 7815 and smaller in the insert direction (e.g., 54.5 mm in the transverse direction and 40 mm in the insert direction.) In this instance, an irregular card having the regular transverse dimension but smaller in the longitudinal dimension can be removed out of the opening 131. The regular card, on the other hand, can be moved over the opening 131 to the predetermined read/write position without falling into the opening.

FIGS. 24 to 32 illustrate a protection cover generally indicated by reference numeral 141. The protection cover 141, which is mounted in front of the IC card read/write device 101 described above, has a front housing generally indicated by reference numeral 143. The front housing 143 is formed with a slot 145 extending between its front and rear surfaces, through which the IC card 13 is inserted into the card chamber 11. The slot 145 should be designed so that a distance between upper and bottom surfaces of the slot 145 is slightly greater than the thickness of the regular sized IC card.

Also, the housing 143 has recesses 147 at its left and right sides of the slot 145, in each of which a card guide 149 is positioned. The card guide 149, which is supported by a shaft 151 running perpendicular to the card insert-direction, has a first arm 153 extending toward an inlet of the slot 145 and a second arm 155 extending toward an outlet of the slot 145. The first arm 153, which is located in left and right sides of region 157 in which the regular size card 13 is inserted (see FIG. 24), is bent upward at its mid-portion so that the leading edge of the regular size card 13 being inserted in the region 157 would make contact with an upper surface portion of the first arm 153 to rotate it downward. The second arm 155, on the other hand, is located outside the region 157 so that it would not make any engagement with the inserting card 13.

Provided on a wall 159 of the housing 143, adjacent to the outlet of the slot 145, is a shutter 161 made from a rectangular plate with its upper and lower ends 163 and 165 extended toward the card chamber 11. The shutter 161 is supported by the combination of vertical slots 163 formed in the shutter 161 and guide bosses (not shown) formed in the wall 159, each positioned in the corresponding vertical slots 163, so that the shutter 161 can move between lowered and lifted positions shown in FIGS. 25 and 27, respectively. Also, the shutter 161 is fixed by bolts 167 each inserted through the slots 163 so that the shutter 161 can slide up and down.

Left and right ends 162 of the shutter 161 are extended out beyond the region 157 over the second arms 155 of the card guide 149 so that the extended left and right ends are supported on the left and right second arms 155, which ensures that, according to the rotation of the card guide 149, the shutter 161 moves up and down between its lifted and lowered positions.

The card guide 149 and shutter 161 are so dimensioned that, in the lifted position, a lower position of the shutter 161 opens the outlet of the slot 145 and, in the lowered position, the lower portion of the shutter 161 closes the outlet of the slot 145.

It should be noted that the card guide 149 is designed so that, only when the mid-portion of the first arm is completely moved away from the slot 145, the shutter 161 can fully be removed from the outlet of the slot 145. This ensures that only when the regular IC card is inserted into the slot 145, the shutter 161 is completely removed from of the outlet of the slot 145, and when an irregular card such as thinned telephone card is inserted into the slot 145, a major part of the outlet is still closed by the shutter 161, whereby the irregular card is prevented from moving into the card chamber 11.

Preferably, to allow the shutter 161 to return from the lifted position to the lowered position, the shutter 161 is biased downward by a leaf spring 169 mounted on the shutter 161.

Also preferably, to cause the shutter 161 to move smoothly and vertically between the lifted and lowered positions and to limit its lifted position, the wall 159 of the housing 143 is formed with vertical and horizontal steps 171, and 173, adjacent to corresponding vertical and horizontal edges of the shutter 161.

In operation, the card 13 inserted into the slot 145 by the user makes contacts at its leading edge with the upper bent surfaces of the left and right first arms 153. Then, further insertion of the card 13 moves the first arms 153 downward. This in turn moves the second arms 155 upward, causing the shutter 161 to move away from the outlet of the slot 145 into the lifted position, which opens the outlet of the slot 145 and thereby allows the card 13 to move into the card chamber 11.

During pulling of the card 13 from the card chamber 11 and then the slot 145, when the leading edge of the card 13 is passed over the first arms 153, the card guides 149 are forced down the lowered position by the shutter 161 and the leaf spring 169.

Although, the first and second arms 153 and 155, are provided only on the left and right sides of the slot 145, they may also be provided at its center.

Also, although the shutter 161 is provided on the upper portion of the wall 159, it may be arranged on the lower portion of the wall 159 so that it moves up and down to close and open the outlet of the slot 145.

Figure 32:
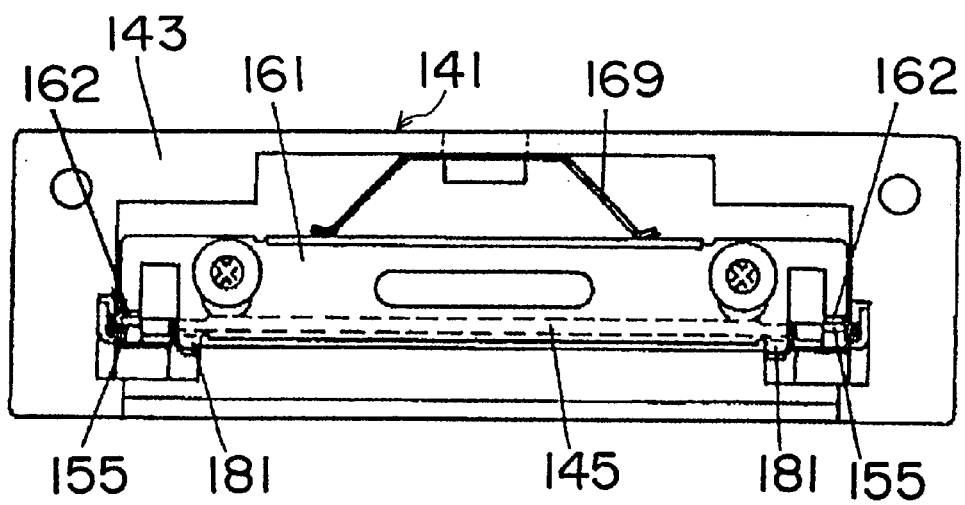
FIG. 32 is a front view of a protection cover of another embodiment.
Figure 33:
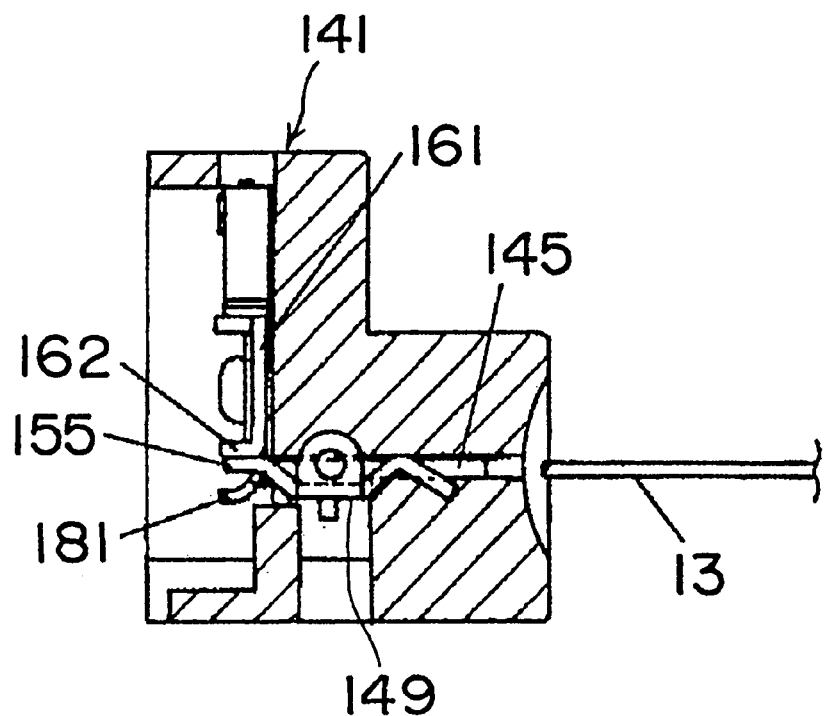
FIG. 33 is a cut-away side elevational view of the protection cover shown in FIG. 32.
Figure 34:
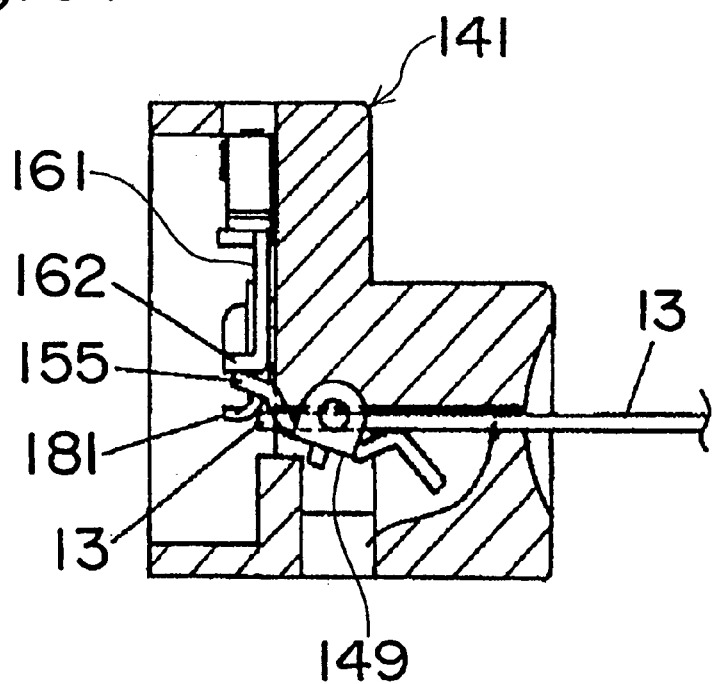
FIG. 34 is another cut-away side elevational view of the protection cover shown in FIG. 32.
Figure 35:
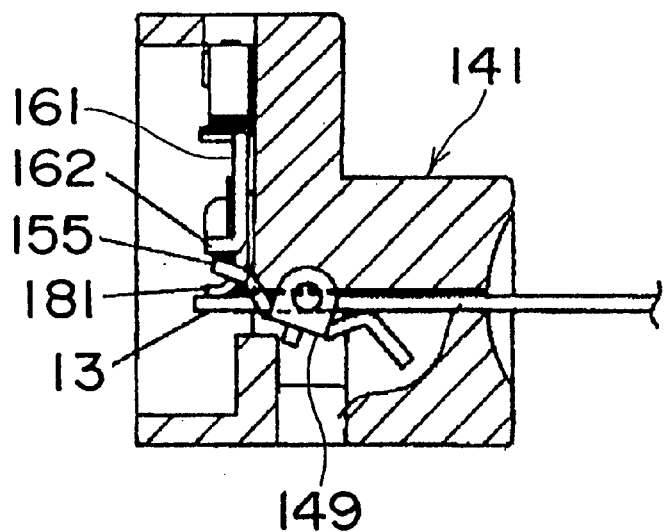
FIG. 35 is another cut-away side elevational view of the protection cover shown in FIG. 32.
Figure 36:
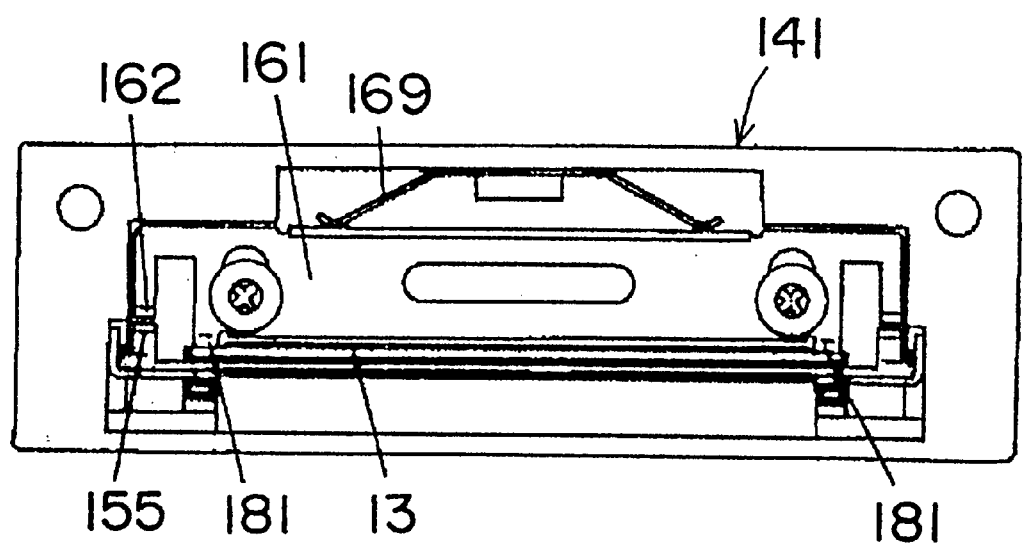
FIG. 36 is a front view of a protection cover of another embodiment.
Figure 37:
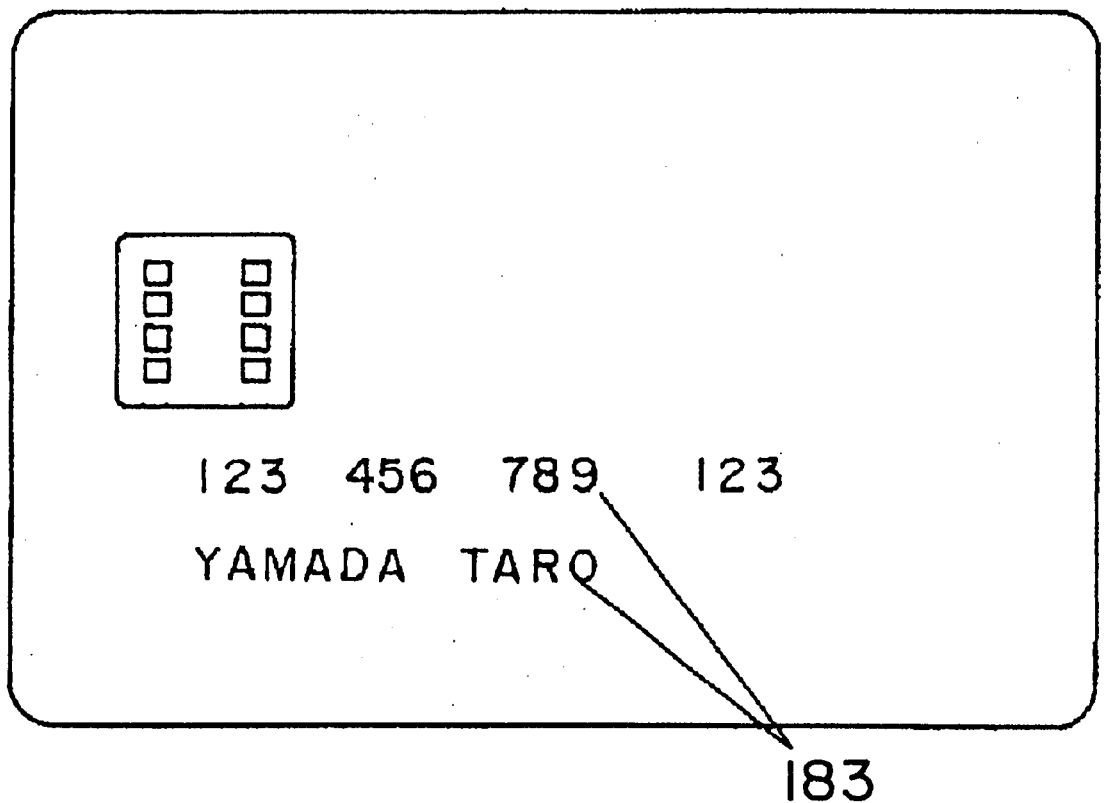
FIG. 37 is an enlarged plan view of an IC card.
Figure 38:
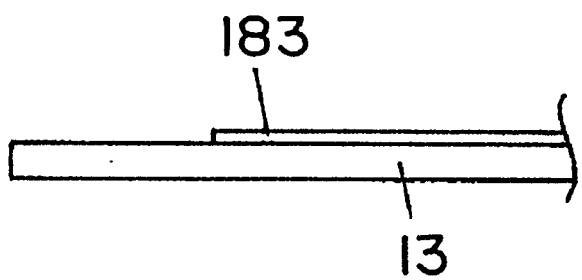
FIG. 38 is an enlarged partial cut-away view of the IC card shown in FIG. 37.

Further, as shown in FIGS. 32 and 36, tongues 181 each curved toward the card chamber are provided on the left and right bottom portions of the lower end 165 of the shutter 162. In this instance, after the shutter 161 is lifted away from the outlet of the slot 145, the leading edge of the card 13 makes frictional contact with the tongues 181, which further forces the shutter 161 upward. This modification is effective for an IC card whose thickness varies depending upon positions due to the existence of embossed letters and/or numbers 183 as shown in FIGS. 37 and 38. Note that the tongues 181 should be arranged so that each of them makes contact with limited upper surface portions of the IC card in which the embossing can be applied (i.e., regions within 3 mm from the longitudinal edges and the mid-portion between them.)

Figure 39:
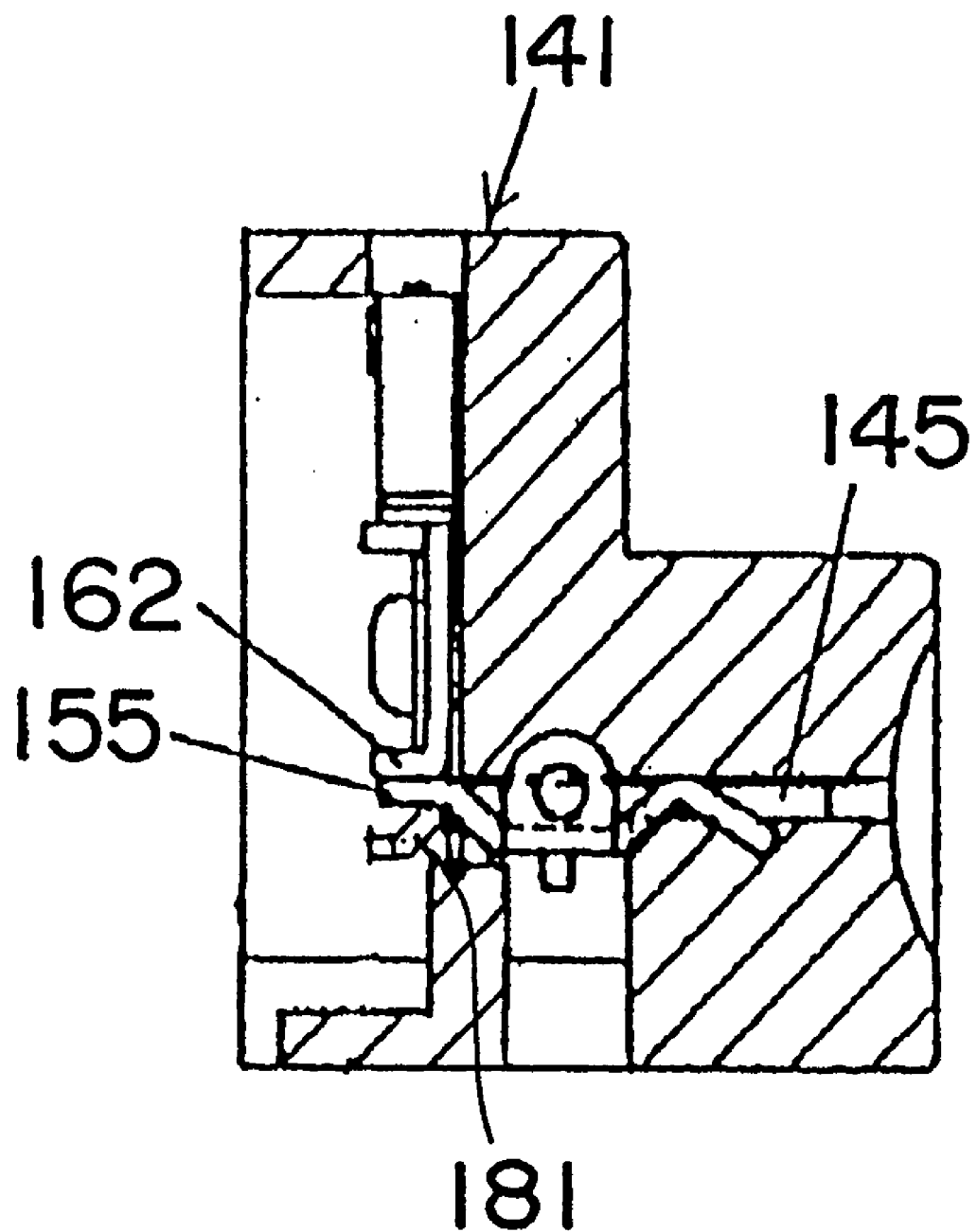
FIG. 39 is a cut-away side elevational view of the protection cover of another embodiment.

Although, the tongues are curved in the previous embodiment, they may be bent at about 30 to 60 degrees as shown in FIG. 39.

Accordingly, with the protection cover described above, when an irregular card such as thinned telephone card is inserted into the slot 145, it is restricted by the shutter that is still closing the major part, in particular the upper portion, of the outlet of the slot 145.

Also, a card smaller than the regular card fails to make contact with the first arms 153, so that is limited by the shutter from moving into the card chamber 11.

Even the regular card cannot be inserted in a skewed position.

Although the present invention has been fully described in connection with the IC card read/write device in which the integrated circuit in the card is communicated through physical contact between the contacts of the IC card and the device, it may equally be applied to a non-contact type of IC card read/write device in which the integrated circuit is communicated with the controller through another communication technique using a radio signal and light.

What is claimed:

1. A protection mechanism for use with an IC card read/write apparatus, comprising:
    a housing that defines a slot having an inlet and an outlet, said housing being constructed and arranged to allow passage of an IC card through said slot from said inlet to said outlet and into an IC card read/write apparatus;
    a first arm that is movable between a first position at which said first arm is positioned in said slot and a second position at which said first arm is positioned out of said slot, said first arm being constructed and arranged to move from the first position to the second position in response to being contacted by the IC card as the IC card passes through said slot from said inlet to said outlet;
    a shutter that is movable between a third position at which said shutter blocks said outlet and a fourth position at which said shutter does not block said outlet; and
    a second arm associated with said first arm and said shutter such that as said first arm moves from the first position to the second position said second arm moves said shutter from the third position to the fourth position, and as said first arm moves from the second position to the first position said second arm moves said shutter from the fourth position to the third position.

2. The protection mechanism according to claim 1, further comprising a tongue supported by said shutter and bent or curved away from said outlet, said tongue being constructed and arranged such that when said shutter is in the third position said tongue is positioned adjacent to said outlet and when said shutter is in the fourth position said tongue is positioned to make frictional contact with the IC card and in response thereto move away from said outlet.

3. The protection mechanism according to claim 2, further comprising a rotatable shaft to which said first arm is fixed, wherein said first arm is constructed and arranged to move from the first position to the second position upon rotation of said rotatable shaft.

4. The protection mechanism according to claim 3, wherein said second arm is associated with said first arm by being fixed to said rotatable shaft, such that as said first arm moves from the first position to the second position upon rotation of said rotatable shaft said second arm moves said shutter from the third position to the fourth position upon rotation of said rotatable shaft, and such that as said first arm moves from the second position to the first position upon rotation of said rotatable shaft said second arm moves said shutter from the fourth position to the third position upon rotation of said rotatable shaft.

5. The protection mechanism according to claim 4, wherein said second arm is associated with said shutter by supporting said shutter thereon, such that when said second arm moves said shutter from the third position to the fourth position said second arm forces said shutter away from said outlet upon rotation of said rotatable shaft, and such that when said second arm moves said shutter from the fourth position to the third position said second arm no longer forces said shutter away from said outlet upon rotation of said rotatable shaft.

6. The protection mechanism according to claim 2, wherein said tongue is supported by said shutter such that when said tongue moves away from said outlet in response to frictional contact between said tongue and the IC card said shutter is also moved away from said outlet.

7. The protection mechanism according to claim 6, further comprising a rotatable shaft to which said first arm is fixed, wherein said first arm is constructed and arranged to move from the first position to the second position upon rotation of said rotatable shaft.

8. The protection mechanism according to claim 7, wherein said second arm is associated with said first arm by being fixed to said rotatable shaft, such that as said first arm moves from the first position to the second position upon rotation of said rotatable shaft said second arm moves said shutter from the third position to the fourth position upon rotation of said rotatable shaft, and such that as said first arm moves from the second position to the first position upon rotation of said rotatable shaft said second arm moves said shutter from the fourth position to the third position upon rotation of said rotatable shaft.

9. The protection mechanism according to claim 8, wherein said second arm is associated with said shutter by supporting said shutter thereon, such that when said second arm moves said shutter from the third position to the fourth position said second arm forces said shutter away from said outlet upon rotation of said rotatable shaft, and such that when said second arm moves said shutter from the fourth position to the third position said second arm no longer forces said shutter away from said outlet upon rotation of said rotatable shaft.

10. The protection mechanism according to claim 1, further comprising a rotatable shaft to which said first arm is fixed, wherein said first arm is constructed and arranged to move from the first position to the second position upon rotation of said rotatable shaft.

11. The protection mechanism according to claim 10, wherein said second arm is associated with said first arm by being fixed to said rotatable shaft, such that as said first arm moves from the first position to the second position upon rotation of said rotatable shaft said second arm moves said shutter from the third position to the fourth position upon rotation of said rotatable shaft, and such that as said first arm moves from the second position to the first position upon rotation of said rotatable shaft said second arm moves said shutter from the fourth position to the third position upon rotation of said rotatable shaft.

12. The protection mechanism according to claim 11, wherein said second arm is associated with said shutter by supporting said shutter thereon, such that when said second arm moves said shutter from the third position to the fourth position said second arm forces said shutter away from said outlet upon rotation of said rotatable shaft, and such that when said second arm moves said shutter from the fourth position to the third position said second arm no longer forces said shutter away from said outlet upon rotation of said rotatable shaft.

13. The protection mechanism according to claim 1, further comprising a rotatable shaft to which said second arm is fixed, wherein said second arm is associated with said first arm such that as said first arm moves from the first position to the second position said second arm moves said shutter from the third position to the fourth position upon rotation of said rotatable shaft, and such that as said first arm moves from the second position to the first position said second arm moves said shutter from the fourth position to the third position upon rotation of said rotatable shaft.

14. The protection mechanism according to claim 13, wherein said second arm is associated with said shutter by supporting said shutter thereon, such that when said second arm moves said shutter from the third position to the fourth position said second arm forces said shutter away from said outlet upon rotation of said rotatable shaft, and such that when said second arm moves said shutter from the fourth position to the third position said second arm no longer forces said shutter away from said outlet upon rotation of said rotatable shaft.

15. The protection mechanism according to claim 14, further comprising a tongue supported by said shutter and bent or curved away from said outlet, said tongue being constructed and arranged such that when said shutter is in the third position said tongue is positioned adjacent to said outlet and when said shutter is in the fourth position said tongue is positioned to make frictional contact with the IC card and in response thereto move away from said outlet.

16. The protection mechanism according to claim 15, wherein said tongue is supported by said shutter such that when said tongue moves away from said outlet in response to frictional contact between said tongue and the IC card said shutter is also moved away from said outlet.

17. The protection mechanism according to claim 1, wherein said second arm is associated with said shutter by supporting said shutter thereon, such that when said second arm moves said shutter from the third position to the fourth position said second arm forces said shutter away from said outlet, and such that when said second arm moves said shutter from the fourth position to the third position said second arm no longer forces said shutter away from said outlet.

18. The protection mechanism according to claim 17, further comprising a tongue supported by said shutter and bent or curved away from said outlet, said tongue being constructed and arranged such that when said shutter is in the third position said tongue is positioned adjacent to said outlet and when said shutter is in the fourth position said tongue is positioned to make frictional contact with the IC card and in response thereto move away from said outlet.

19. The protection mechanism according to claim 18, wherein said tongue is supported by said shutter such that when said tongue moves away from said outlet in response to frictional contact between said tongue and the IC card said shutter is also moved away from said outlet.

20. The protection mechanism according to claim 1, wherein said first arm includes an angled and upwardly projected mid-portion that is movable between the first position at which said angled and upwardly projected mid-portion is positioned in said slot and the second position at which said angled and upwardly projected mid-portion is positioned out of said slot, such that said angled and upwardly projected mid-portion is to move from the first position to the second position when said angled and upwardly projected mid-portion is contacted by the IC card as the IC card passes through said slot from said inlet to said outlet, and such that said second arm is to move said shutter from the third position to the fourth position as said angled and upwardly projected mid-portion moves from the first position to the second position, and said second arm is to move said shutter from the fourth position to the third position as said angled and upwardly projected mid-portion moves from the second position to the first position.

21. The protection mechanism according to claim 20, further comprising a tongue supported by said shutter and bent or curved away from said outlet, said tongue being constructed and arranged such that when said shutter is in the third position said tongue is positioned adjacent to said outlet and when said shutter is in the fourth position said tongue is positioned to make frictional contact with the IC card and in response thereto move away from said outlet.

* * * * *